US011787967B2

(12) United States Patent
Asirvatham

(10) Patent No.: US 11,787,967 B2
(45) Date of Patent: *Oct. 17, 2023

(54) BRANCHED AMINO ACID SURFACTANTS FOR INKS, PAINTS, AND ADHESIVES

(71) Applicant: AdvanSix Resins & Chemicals LLC, Parsippany, NJ (US)

(72) Inventor: Edward Asirvatham, Chatham, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/373,706

(22) Filed: Jul. 12, 2021

(65) Prior Publication Data
US 2022/0010161 A1 Jan. 13, 2022

Related U.S. Application Data

(60) Provisional application No. 63/051,191, filed on Jul. 13, 2020.

(51) Int. Cl.
*C09D 11/54* (2014.01)
*C09D 9/04* (2006.01)
*C09J 11/06* (2006.01)

(52) U.S. Cl.
CPC .............. *C09D 11/54* (2013.01); *C09D 9/04* (2013.01); *C09J 11/06* (2013.01)

(58) Field of Classification Search
CPC ....... C09D 11/322; C09D 11/38; C09D 11/40; B41J 2/01; B41M 5/0023; B41M 5/5281; C11D 1/46; A61K 8/44; C07C 295/15; C07C 237/00
See application file for complete search history.

(56) References Cited

U.S. PATENT DOCUMENTS

| 2,781,349 A | * | 2/1957 | Mannheimer | ......... C07C 309/14 |
| | | | | 516/14 |
| 3,001,997 A | * | 9/1961 | Mannheimer | ......... C07D 207/20 |
| | | | | 516/15 |
| 4,194,052 A | | 3/1980 | Lewis et al. | |
| 4,550,137 A | | 10/1985 | Dowbenko et al. | |
| 5,851,982 A | | 12/1998 | Sakata et al. | |
| 6,372,703 B1 | | 4/2002 | Richter et al. | |

(Continued)

FOREIGN PATENT DOCUMENTS

| CA | 2006439 A1 | 7/1990 |
| CN | 105802600 A | 7/2016 |

(Continued)

OTHER PUBLICATIONS

International Search Report and Written Opinion issued in International Application No. PCT/US2021/041339, dated Jan. 7, 2022, 22 pages.

(Continued)

*Primary Examiner* — John Zimmermann
(74) *Attorney, Agent, or Firm* — Faegre Drinker Biddle & Reath LLP

(57) ABSTRACT

Inks, paints, adhesives, and paint strippers may be formulated to include one or more branched surfactants, from one or more surfactant classes, such as derivatives of amino acids that have surface-active properties.

20 Claims, 12 Drawing Sheets

(56) References Cited

U.S. PATENT DOCUMENTS

| | | |
|---|---|---|
| 9,481,695 B2 | 11/2016 | Knott et al. |
| 10,227,548 B2 | 3/2019 | Zhang et al. |
| 2003/0060390 A1 | 3/2003 | Demeyere et al. |
| 2007/0167347 A1 | 7/2007 | Gallotti et al. |
| 2007/0179080 A1 | 8/2007 | Gallotti et al. |
| 2008/0259100 A1 | 10/2008 | Rengaswamy et al. |
| 2014/0246041 A1 | 9/2014 | Krueger |
| 2015/0141315 A1 | 5/2015 | Jin |
| 2016/0340610 A1 | 11/2016 | Zhang et al. |
| 2017/0137750 A1 | 5/2017 | Zhang et al. |
| 2017/0342346 A1 | 11/2017 | Zhang et al. |
| 2017/0349859 A1 | 12/2017 | Zhang et al. |
| 2018/0002639 A1 | 1/2018 | Zhang et al. |
| 2018/0362790 A1* | 12/2018 | Watanabe .............. C09D 11/38 |
| 2018/0371366 A1 | 12/2018 | Zhang et al. |
| 2019/0300822 A1 | 10/2019 | Zhang et al. |
| 2021/0062026 A1* | 3/2021 | Shimura ............. B41M 5/0023 |
| 2021/0187460 A1* | 6/2021 | Asirvatham ........... C09D 11/38 |
| 2021/0229053 A1* | 7/2021 | Asirvatham ............ C09D 7/45 |
| 2021/0230106 A1* | 7/2021 | Asirvatham ............ A61Q 5/02 |
| 2021/0292583 A1* | 9/2021 | Asirvatham ............ C09J 11/06 |
| 2021/0292647 A1* | 9/2021 | Asirvatham ............ C09K 13/08 |
| 2022/0009879 A1* | 1/2022 | Asirvatham .......... C07C 229/12 |
| 2022/0009881 A1* | 1/2022 | Asirvatham .......... C07C 229/12 |
| 2022/0010243 A1* | 1/2022 | Asirvatham ............. C11D 3/43 |
| 2022/0016248 A1* | 1/2022 | Asirvatham ......... A61K 9/0019 |
| 2022/0017821 A1* | 1/2022 | Asirvatham ...... H01L 21/30604 |

FOREIGN PATENT DOCUMENTS

| | | |
|---|---|---|
| CN | 109154029 A | 1/2019 |
| DE | 10021538 B4 | 6/2008 |
| DE | 102015223826 A1 | 9/2016 |
| EP | 0385562 A2 | 9/1990 |
| EP | 0883600 B1 | 10/2001 |
| EP | 1155870 A2 | 11/2001 |
| EP | 1584674 A1 | 10/2005 |
| EP | 3158042 B1 | 12/2018 |
| EP | 3350160 B1 | 5/2021 |
| GB | 2310659 A | 9/1997 |
| JP | 01-190798 A | 7/1989 |
| JP | 08-232168 A | 9/1996 |
| JP | 09-105076 A | 4/1997 |
| JP | 2001-048851 A | 2/2001 |
| JP | 3425227 B2 | 7/2003 |
| JP | 3502679 B2 | 3/2004 |
| JP | 3502680 B2 | 3/2004 |
| JP | 3563473 B2 | 9/2004 |
| JP | 2005-054327 A | 3/2005 |
| JP | 4156467 B2 | 9/2008 |
| JP | 2012-116755 A | 6/2012 |
| JP | 2014-129269 A | 7/2014 |
| WO | 96/03370 A1 | 2/1996 |
| WO | 97/31889 A1 | 9/1997 |
| WO | 2008/083967 A2 | 7/2008 |
| WO | 2017/048555 A1 | 3/2017 |
| WO | 2017/101798 A1 | 6/2017 |
| WO | 2017/202289 A1 | 11/2017 |
| WO | 2018/077578 A1 | 5/2018 |
| WO | 2018/107410 A1 | 6/2018 |
| WO | 2018/200943 A1 | 11/2018 |
| WO | 2019/036030 A1 | 2/2019 |
| WO | 2019/110371 A1 | 6/2019 |

OTHER PUBLICATIONS

Anonymous, "Biocidal Compositions containing 4,4'-dichloro-2-hydroxydiphenylether (DCPP)," IP.com No. IPCOM000213522D, Dec. 20, 2011, pp. 1-36.

International Preliminary Report on Patentability received for PCT Patent Application No. PCT/US2021/041339, dated Jan. 26, 2023, 12 pages.

* cited by examiner

BRANCHED AMINO ACID SURFACTANTS FOR INKS, PAINTS, AND ADHESIVES

CROSS-REFERENCE TO RELATED APPLICATION

This application claims priority to Provisional Application No. 63/051,191, filed Jul. 13, 2020, which is herein incorporated by reference in its entirety.

FIELD

The present disclosure pertains to branched surfactants for use in adhesives and paints. Such branched surfactants may include derivatives of amino acids wherein the derivatives have surface-active properties.

BACKGROUND

Surfactants (molecules with surface-active properties) are widely used in commercial formulations of inks, paints, adhesives, and paint strippers. The surfactants may be included as emulsifiers, wetting agents, foaming agents, dispersants, and/or agents to improve spreadability.

The surfactants may be uncharged, zwitterionic, cationic, or anionic. Although in principle any surfactant class (e.g., cationic, anionic, nonionic, amphoteric) is suitable, it is possible that a formulation may include a combination of two or more surfactants from two or more surfactant classes.

Often, surfactants are amphiphilic molecules with a relatively water-insoluble hydrophobic "tail" group and a relatively water-soluble hydrophilic "head" group. These compounds may adsorb at an interface, such as an interface between two liquids, a liquid and a gas, or a liquid and a solid. In systems comprising relatively polar and relatively non-polar components the hydrophobic tail preferentially interacts with the relatively non-polar component(s) while the hydrophilic head preferentially interacts with the relatively polar component(s). In the case of an interface between water and oil, the hydrophilic head group preferentially extends into the water, while the hydrophobic tail preferentially extends into the oil. When added to a water-gas interface, the hydrophilic head group preferentially extends into the water, while the hydrophobic tail preferentially extends into the gas. The presence of the surfactant disrupts at least some of the intermolecular interaction between the water molecules, replacing at least some of the interactions between water molecules with generally weaker interactions between at least some of the water molecules and the surfactant. This results in lowered surface tension and can also serve to stabilize the interface.

At sufficiently high concentrations, surfactants may form aggregates which serve to limit the exposure of the hydrophobic tail to the polar solvent. One such aggregate is a micelle. In a typical micelle the molecules are arranged in a sphere with the hydrophobic tails of the surfactant(s) preferentially located inside the sphere and the hydrophilic heads of the surfactant(s) preferentially located on the outside of the micelle where the heads preferentially interact with the more polar solvent. The effect that a given compound has on surface tension and the concentration at which it forms micelles may serve as defining characteristics for a surfactant.

SUMMARY

The present disclosure provides formulations of inks, paints, adhesives, and paint strippers. These products may be formulated to include one or more surfactants from one or more surfactant classes disclosed herein. The surfactants may be used as emulsifiers, wetting agents, dispersants, and/or agents to improve spreadability.

The present disclosure provides surfactants for paints, inks, adhesives, and paint strippers in the form of derivatives of amino acids that have surface-active properties. The amino acids may be naturally occurring or synthetic amino acids, or they may be obtained via ring-opening reactions of molecules such as lactams, for instance caprolactam. The amino acids may be to form compounds with surface-active properties. Characteristically, these compounds may have low critical micelle concentrations (CMC) and/or the ability to reduce the surface tension of a liquid.

The present disclosure provides a formulation for an ink fixer fluid, comprising at least one surfactant of Formula I:

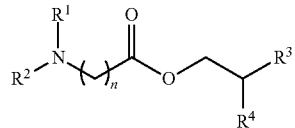

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate; one or more humectants, a metal carboxylate salt as fixer agent, and an acid. The formulation may also an aqueous vehicle and one or more colorants dispersed in an ink vehicle.

The present disclosure further provides a formulation for paint, comprising at least one surfactant of Formula I:

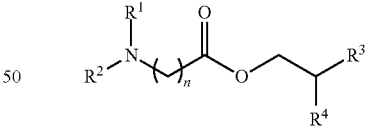

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate; a latex, a binder, one or more driers, one or more pigments, one or more solvents, and water.

The present disclosure also provides a formulation for adhesives, comprising at least one surfactant of Formula I:

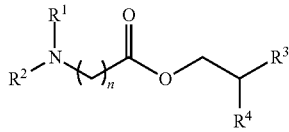

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate; a resin, one or more fillers, and a solvent.

The present disclosure further provides a formulation for a paint stripper, comprising at least one surfactant of Formula I:

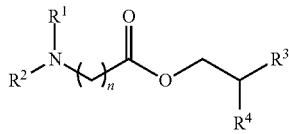

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate; dichloroethylene; one or more co-solvents; one or more corrosion inhibitors; a wax; optional thickeners; and water.

The above mentioned and other features of the disclosure, and the manner of attaining them, will become more apparent and will be better understood by reference to the following description of embodiments taken in conjunction with the accompanying drawings.

DETAILED DESCRIPTION

I. Definitions

Figure 1:
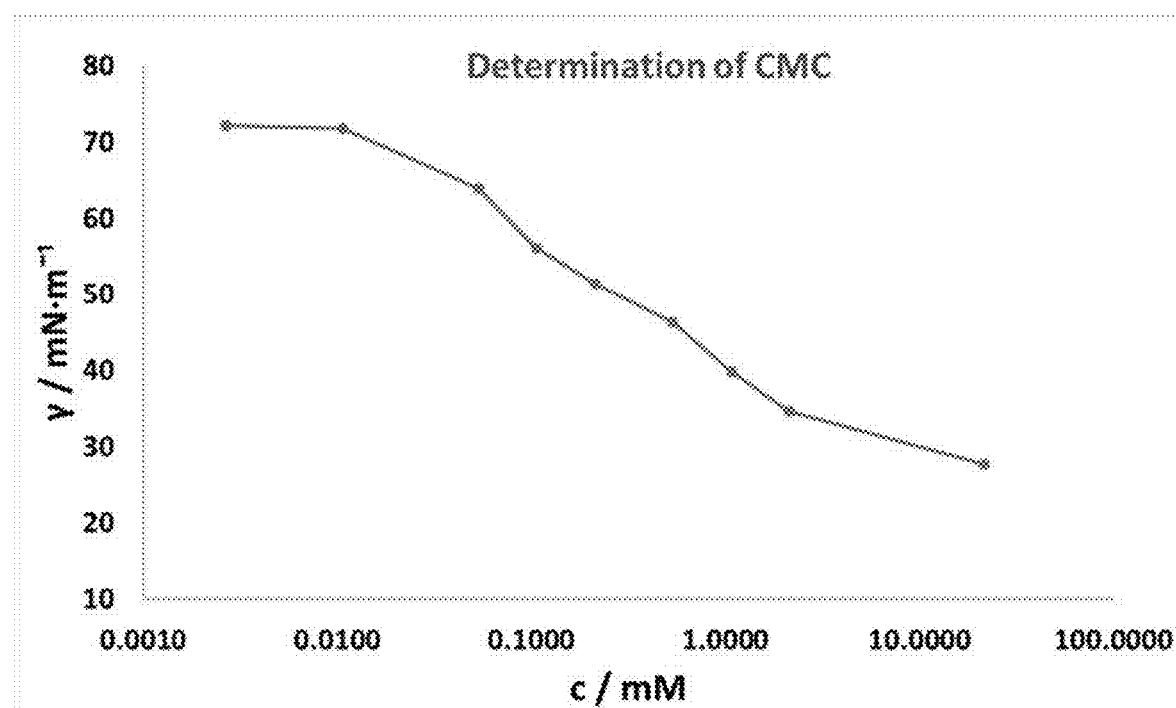
FIG. 1 shows a plot of surface tension versus concentration measured at pH=7 as described in Example 1B, wherein the Y axis depicts the surface tension (γ) in millinewtons per meter (mN/m) and the X axis depicts the concentration (c) in millimoles (mM).

As used herein, the phrase "within any range using these endpoints" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the word "alkyl" means any saturated carbon chain, which may be a straight or branched chain.

As used herein, the phrase "surface-active" means that the associated compound is able to lower the surface tension of the medium in which it is at least partially dissolved, and/or the interfacial tension with other phases, and, accordingly, may be at least partially adsorbed at the liquid/vapor and/or other interfaces. The term "surfactant" may be applied to such a compound.

With respect to the terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

The present disclosure provides formulations of inks, paints, adhesives, and paint strippers.

II. Inks

There are several reasons that inkjet printing has become a popular way of recording images on various media surfaces, particularly paper. Some of these reasons include low printer noise, capability of high-speed recording, high quality and multi-color recording. Additionally, these advantages can be obtained at a relatively low price to consumers. However, though there has been great improvement in inkjet printing, accompanying this improvement are increased demands by consumers in this area, e.g., higher speeds, higher resolution, full color image formation, increased stability, more permanent images, etc.

Sets of inkjet inks are used in color inkjet printing systems. The ink set often includes a plurality of different colored inks, commonly in groups of four, six or eight colors (e.g., one or more shades of cyan, magenta, yellow and/or black), and may further include an image fixing/fixer fluid. The fixer fluid is often applied before or after an ink is established on the print media surface. The fixer fluid is a substantially colorless liquid that interacts with the colorant and/or polymeric components of the ink(s) to thereby precipitate or otherwise fix the ink(s) to the print media surface.

The precipitated colorants deposit on the surface of the media, which results in the enhancement of image quality attributes, for example, optical density and chroma. Durability attributes like water-fastness and highlighter smear also benefit from such reactive ink chemistry. Although several suitable ink sets including a fixer fluid are currently available, improvements thereto are desirable to formulate more durable and reliable inks that will produce higher quality print images on the print media surface without damaging the printhead containing it. Without being linked by any theory; it is believed that after the fixer composition is overprinted with the inkjet ink composition on the substrate or, in other words, when ink and fixer meet on the media surface, a very effective crashing of ink colorants is realized and nearly all the colorants are deposited on the surface of the media rather than penetrating the media and depositing below the surface. Concurrently, the fixer vehicle, upon mixing with the ink vehicle, becomes highly wetting and the mixed vehicle quickly penetrates the media, leaving the colorants behind.

Within such inkjet printing method, the combination of the fixer fluid and of the inkjet ink composition results in a system and method that provide high quality and durable inkjet image prints. The use of the fixer fluid of the present disclosure results in the enhancement of image quality attributes, for example, optical density, chroma, and durability. Furthermore, the fixer fluid composition provides good image quality without adversely affecting inkjet architecture reliability when used in inkjet printing system. Indeed, it has been found that the fixer fluid does not display damages to the printhead containing it and displays a low corrosivity toward inkjet system and inkjet pen.

The ink formulations of the present disclosure include an inkjet fixer composition that includes one or more surfactant chosen from one or more surfactant classes, one or more humectants, a metal carboxylate salt as fixer agent, and an acid in view of adjusting the pH of said composition to a pH between about 5.0 and about 7.0. The formulation may also an aqueous vehicle and one or more colorants dispersed in an ink vehicle.

1. Surfactant

The ink formulations of the present disclosure comprise one or more surfactants, also referred to as the surfactant system. The surfactants have excellent capacity of maintaining the surface tension and interfacial tension to adequate levels. The surfactants may also be used as wetting agents and dispersants. Suitable surfactants for use in the ink formulations of the present disclosure include one or more surfactants and/or co-surfactants of Formula I:

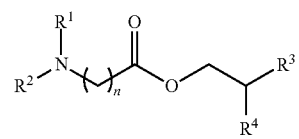

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C^{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate.

In particular, suitable surfactants or co-surfactants may include one or more of any of Surfactants 1-7 described herein.

The amount of the surfactant system in the ink formulation may range from about 0 wt. % or greater, about 0.1 wt. % or greater, about 0.2 wt. % or greater, about 0.4 wt. % or greater, about 0.6 wt. % or greater, about 0.8 wt. % or greater, or about 1.0 wt. % or lower, about 1.2 wt. % or lower, about 1.4 wt. % or lower, about 1.6 wt. % or lower, about 1.8 wt. % or lower, about 2.0 wt. % or lower, or within any range using these endpoints, by weight of the composition.

2. Humectant

The ink formulation of the present disclosure includes humectants. As "humectant", it is meant herein any substance used as a wetting or moistening agent. Without being linked by any theory, humectants maintain the fixer water content in a narrow range regardless of humidity fluctuations and are therefore often added in order to prevent clogging of narrow inkjet pen nozzles.

Humectants are high-boiling water-miscible organic compounds, such as polyols, amides, or polyethers. The humectants may be water-soluble. Suitable water-soluble humectants suitable for this purpose include, but are not limited to, heterocyclic ketones (e.g., 2-pyrrolidone, N-methyl-pyrrolid-2-one, 1,3-dimethyl-imidazolid-2-one, octyl-pyrrolidone, etc.); glycols (e.g., ethylene glycol, diethylene glycol, triethylene glycol, tetraethylene glycol, propylene glycol, polyethylene glycol, polypropylene glycol, etc.); glycerols; and diols (e.g., butanediol, pentanediol, hexanediol, etc.).

The humectant may be present in the ink formulation in an amount of about 1 wt. % or greater, 2 wt. % or greater, 5 wt. % or greater, 8 wt. % or greater, or 10 wt. % or lower, 12 wt. % or lower, 15 wt. % or lower, 18 wt. % or lower, 20 wt. % or lower, or within any range using these endpoints.

3. Fixing Agent

The "fixing fluid" or "fixer fluid" contains an aqueous vehicle and an effective amount of one or more fixing agents. A fixer agent is an ingredient that initiates a change in the solubility or stability of the colorant and fixes the colorant in place in the printed image. An "effective amount" of fixer agent is an amount that is effective in achieving an improvement in print quality, e.g., decreased strikethrough and bleed, increased optical density (OD), chroma, edge acuity, and improved drip and smear fastness, as compared to a print that has not been fixed. The fixing fluid can be formulated for high spread and quick penetration and drying. The surface tension can be less than about 45 mN/m.

The fixer agent may be metal carboxylate salt, such as a metal salt composed of a multivalent metallic ion and of a carboxylate ion.

Suitable metal carboxylate salts may include multivalent metal carboxylate salts carboxylate salts including divalent metallic ions such as $Ca^{2+}$, $Mg^{2+}$, $Cu^{2+}$ and trivalent metal ions such as $Al^{3+}$, $La^{3+}$ or $Fe^{3+}$.

The carboxylate ions may be aliphatic monocarboxylic acids having from 1 to 6 carbon atoms. Suitable carboxylate ions include acetic acid, propionic acid, butyric acid, isobutyric acid, valeric acid, isovaleric acid, pivalic acid and hexanoic acid The fixer agent is present in the fixer fluid composition in an amount of about 3 wt. % or greater, about 4 wt. % or greater, about 5 wt. % or greater, about 6 wt. % or greater, about 7 wt. % or greater, about 8 wt. % or greater, about 9 wt. % or greater, or about 10 wt. % or lower, about 11 wt. % or lower, about 12 wt. % or lower, about 13 wt. % or lower, about 14 wt. % or lower, about 15 wt. % or lower, about 16 wt. % or lower, or within any range using these endpoints.

4. Acid

The fixer fluid may include an acid. Any suitable acid may be selected. For example, a strong acid (i.e., an acid that is fully ionized in water) may be added to the fixer fluid composition. Non-limiting examples of such acids include methanesulfonic acid, hydrochloric acid, nitric acid, hydrobromic acid, sulfuric acid, perchloric acid, hydroiodic acid, trifluoroacetic acid, and/or combinations thereof.

The acid helps to adjust the pH of the fixer fluid composition. The pH of the fixer fluid composition may be about 5.0 or greater, about 5.5 or greater, about 6.0 or greater, or about 6.5 or lower, about 7.0 or lower, or within any range using these endpoints.

In some aspects, the fixer formulation will not form or will form less than 0.5% of acid vapors (volatile organic acid) upon assembly. In some other aspects, the pH of the fixer fluid will be adjusted to within a suitable range to avoid fixer fluid composition containing more than 0.5 wt % of volatile organic acids.

5. Aqueous Agent

The fixer fluid of the present disclosure may contain an aqueous vehicle. The term "aqueous vehicle," as defined herein, refers to the aqueous mix in which the fixer agent is placed to form the fixer fluid. Suitable aqueous vehicle components may include, but are not limited to, water, co-solvents, surfactants, additives (corrosion inhibitors, salts, etc.), and/or combinations thereof.

The aqueous vehicle may include a water-soluble organic co-solvent, an additional surfactant, and water. Non-limiting examples of the water-soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof.

6. Colorants

The inkjet ink set of the present disclosure may include some aspects of the previously described fixer fluid composition and an ink having a colorant dispersed or dissolved in an ink vehicle. The inkjet ink set may include, at least, an inkjet ink composition including a colorant dispersed in an ink vehicle, and a fixer fluid including one or more surfactants chosen from one or more surfactant classes, one or more humectants, a metal carboxylate salt as fixer agent, and an acid.

It is to be understood that any number of colored ink compositions may be included in the ink set with the fixer. Furthermore, any desirable combination of colored inks may be used. For example, each of the colored ink compositions may be of a different color, or two or more of the inks may be different shades of the same color (i.e., light magenta and dark magenta inks). In some aspects, the inkjet ink set includes four different colored inks: a black ink, a yellow ink, a cyan ink, and a magenta ink. In other aspects, the inkjet ink set includes any desirable number of inks selected from black ink, yellow ink, cyan ink, magenta ink, orange ink, red ink, green ink, and/or combinations thereof. In some aspects, the inkjet ink set includes the fixer fluid such as described herein and includes an inkjet ink composition selected from a black ink, a yellow ink, a cyan ink, a magenta ink, an orange ink, a red ink, and a green ink, and wherein the ink set further includes at least one other ink selected from a black ink, a yellow ink, a cyan ink, a magenta ink, an orange ink, a red ink, and a green ink.

The colorant for each ink is selected from a pigment, a dye, or combinations thereof. In some embodiments, the ink contains pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment. As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The pigments include both self-dispersed pigments as well as dispersed pigments, e.g., pigments dispersed by a separate dispersing agent that is not covalently attached to the surface. In one example, the pigments are not self-dispersing, and a dispersing aid may be added to the vehicle. In another example, the pigments are self-dispersable and modified to include at least one polymer chemically attached thereto The colorant for the cyan and/or magenta inks may be a combination of a pigment and a dye. The pigments and/or dyes for the cyan and magenta colorants may be selected from several commercially available pigments and/or dyes. Non-limiting examples of suitable pigments for the cyan colorant include pigment blue 1, pigment blue 2, pigment blue 3, pigment blue 15:3, pigment blue 15:4, pigment blue 16, pigment blue 22, vat blue 4, vat blue 6, and/or the like, and/or combinations thereof. Examples of suitable dyes for the cyan colorant include, but are not limited to triphenylmethane dyes, such as, for example, acid blue 9 and acid blue 7, and phthalocyanine dyes, such as, for example, direct blue 199. Non-limiting examples of suitable pigments for the magenta colorant include pigment red 5, pigment red 7, pigment red 12, pigment red 48, pigment red 48, pigment red 57, pigment red 112, pigment red 122, and/or the like, and/or combinations thereof. Examples of suitable dyes for the magenta colorant include, but are not limited to, xanthene dyes, such as, for example, acid red 52, acid red 289, γ-acid dyes, H-acid dyes, and/or combinations thereof.

The colorant for the black and/or the yellow ink may be a dye or a pigment. Examples of suitable dyes for the black colorant include, but are not limited to, water soluble metal complex azo dyes such as Reactive Black 31 and Reactive Black 8, water soluble polyazo dyes such as Direct Black 19, Direct Black 195, and Direct Black 168, and water soluble sulfur dyes such as Solubilized Sulfur Black 1. Materials such as carbon black or derivatives of carbon black are non-limiting examples of suitable pigments for the black ink.

Examples of suitable dyes for the yellow colorant include, but are not limited to AY-17, AY-23, DY-132, Y-104, and/or combinations thereof. PY-74 is a non-limiting example of a suitable pigment for the yellow ink.

It is to be understood that one or more of the inks in the ink set may contain substantially the same colorant and/or substantially the same ink vehicle formulation. In an example, the ink set includes the yellow ink, the cyan ink, and the magenta ink, each of which has substantially the same ink vehicle formulation.

The amount of colorant present in the respective ink compositions ranges from about 2.7 wt. % or greater, about 2.9 wt. % or greater, about 3.0 wt. % or greater, about 3.2 wt. % or greater, about 3.4 wt. % or greater, or about 3.6 wt. % or lower, about 3.8 wt. % or lower, about 4.0 wt. % or lower, about 4.2 wt. % or lower, about 4.4 wt. % or lower, about 4.5 wt. % or lower, or within any range using these endpoints. It is to be understood however, that the colorant loading may be more or less, as desired.

7. Other Additives

One or more additives may also be incorporated into the fixer composition. As used herein, the term "additive" refers to a constituent of the fluid that operates to enhance performance, environmental effects, aesthetic effects, or other similar properties of the fluid. Suitable additives include biocides, sequestering agents, chelating agents, anti-corrosion agents, marker dyes (e.g., visible, ultraviolet, infrared, fluorescent, etc.) and/or the like, and/or combinations thereof. The fixer may include an anti-corrosion agent such as, for example, Cobratec®CBT, a carboxybenzotriazole that is commercially available from PMC Specialties Group, Inc.

The additives are present in the fixer composition in an amount ranging of about 0 wt. % or greater, about 0.01 wt. % or greater, about 0.1 wt. % or greater, about 0.2 wt. % or greater, about 0.3 wt. % or greater, about 0.4 wt. % or greater, or about 0.5 wt. % or lower, about 0.6 wt. % or lower, about 0.7 wt. % or lower, about 0.8 wt. % or lower, about 0.9 wt. % or lower, about 1 wt. % or lower, or within any range using these endpoints. It is to be understood that the upper limit of the amount of additive present depends, at least in part, on the additive used, the impact on the image, its solubility, the impact on pen function, and/or combinations thereof.

8. Ink Vehicle

Each colorant or combination of colorants is combined with respective individual ink vehicles to form one or more inks of the ink set. As defined herein, an "ink vehicle" refers to the vehicle in which the colorant is placed to form the ink. A wide variety of ink vehicles may be used with the inks, ink sets, and methods according to embodiments disclosed herein. Non-limiting examples of suitable components for the ink vehicle include water soluble polymers, anionic polymers, surfactants, solvents, co-solvents, buffers, biocides, sequestering agents, viscosity modifiers, surface-active agents, chelating agents, resins, and/or water, and/or combinations thereof.

Suitable solvents for the ink vehicle include, but are not limited to glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol® DHE (Lonza Inc., Fairlawn N.J.), and/or combinations thereof. Inks used in combination with the fixer may include one or more of the following solvents: ethylene glycol, diethylene glycol, triethylene glycol, or 1-propoxy-2-propanol.

Solvents may be present in the ink vehicle in an amount of about 1 wt. % or greater, about 5 wt. % or greater, about 10 wt. % or greater, or about 15 wt. % or lower, about 20 wt. % or lower, about 25 wt. % or lower, or within any range using these endpoints.

The amount and type of solvent used depends, at least in part, on the desirable properties of the ink. As such, the amounts may vary as desired. In some aspects, a single solvent is used in the ink vehicle of one or more of the colored inks. Suitable solvents include, but are not limited to tripropylene glycol, tetraethylene glycol, or 1-(2-hydroxyethyl)-2-pyrrolidone. In other aspects, the inks include a mixture of two or more of the previously listed solvents.

As non-limiting examples, the cyan, magenta, yellow and black inks include a mixture of Dantocol® DHE and 1-(2-hydroxyethyl)-2-pyrrolidone. The total weight percent of the solvent mixture ranges may be about 7 wt. % or greater, about 9 wt. % or greater, about 11 wt. % or greater, about 13 wt. % or greater, about 15 wt. % or greater, or about 17 wt. % or lower, about 19 wt. % or lower, about 21 wt. % or lower, about 22 wt. % or lower, or within any range using these endpoints.

Suitable surfactants include the surfactants of the present disclosure, and/or ethoxylated alcohols, fluorinated surfactants, 2-diglycol surfactants, phosphate ester surfactants, diphosphate ester surfactants, alkyl sulfates, alkyl ether sulfates, and/or combinations thereof.

One or more surfactants may be present in the ink vehicle in an amount of about 8 wt. % or lower, about 6 wt. % or lower, about 4 wt. % or lower, about 2 wt. % or lower, about 1 wt. % or lower, or about 0.1 wt. % or lower.

The ink vehicle may include at least one polymer. The polymers for the ink vehicle are generally water-soluble and may be selected from those of the salts of styrene-(meth) acrylic acid copolymers, polystyrene-acrylic polymers, polyurethanes, and/or other water-soluble polymeric binders, and/or combinations thereof. Non-limiting examples of suitable polyurethanes include those that are commercially available from Dainippon Ink & Chem., Inc. (DIC), located in Osaka, Japan.

The polymer may be present in the ink vehicle in an amount of about 0.01 wt. % or greater, about 0.1 wt. % or greater, about 0.5 wt. % or greater, about 1 wt. % or greater, or about 2 wt. % or lower, about 3 wt. % or lower, about 4 wt. % or lower, or within any range using these endpoints.

Additives may also be incorporated into embodiments of the ink vehicle for the inks. As a non-limiting example, bactericides, such as Proxel® GXL, may be added to the ink to protect the ink from bacterial growth. Other suitable additives include, but are not limited to, buffers, biocides, sequestering agents, chelating agents, or the like, or combinations thereof.

The ink vehicle includes one or more additives present in an amount ranging of about 0 wt. % or greater, about 0.1 wt. % or greater, about 0.2 wt. % or greater, or about 0.3 wt. % or lower, about 0.4 wt. % or lower, about 0.5 wt. % or lower, or within any range using these endpoints.

9. Method of Making

The inks formulations may be prepared by combining the solvents, the surfactants, any additive(s), and water, and adjusting the pH to a basic pH. In some aspects, the pH of the colored ink ranges from about 8 to about 11. In other embodiments, the pH of the colored ink ranges from about 8.5 to about 9.5. Colorants and polymers are then added to form the ink compositions.

III. Paints

The present disclosure provides formulations of paints, specifically latex compositions or paint vehicles for semi-gloss and flat interior paint compositions. Latex paint compositions have captured a significant portion of the indoor and outdoor paint market because they have several advantages as compared with the organic solvent type.

The paint formulations of the present disclosure may include a film forming agent, a binder, one or more surfactants chosen from one or more surfactant classes, one or more driers, one or more pigments, one or more solvents, and water.

1. Film Forming Agent

Film forming agents are a group of chemicals that leave a pliable, cohesive, and continuous covering over a surface. This film has strong hydrophilic properties. Film forming agents comprise a large group of chemicals which may be divided broadly into two categories: natural and synthetic.

Natural film forming agents include, oils, rosins, carbohydrates, and albumen. Such natural film forming agents may include cyclic oligoterpenes, polyterpenes, shellac, (such as starches, celluloses, and the like.

Synthetic film forming agents include polycondensation materials, polyaddition materials, and polymeric resins. Synthetic film forming agents may include alkyd resins, polyesters, polyamides/imides, silicone resins, crosslinked materials such as phenolic resins, melamine resins, urea resins, polyurethanes, epoxy resins, polyolefins, polyvinyl resins, and polyacrylic resins.

Latex paints often include synthetic film-forming agents, such as polyacrylate resins and alkyd resins, as discussed further below.

a. Latex Emulsion

Two types of emulsions commonly used in formulating latex paints include the all acrylic system, e.g., the systems using copolymerized methyl methacrylate, butyl acrylate, 2-ethylhexylacrylate with small proportions of acrylic acid, etc., as may be desired, and vinyl acetate formulations usually in combination with a small proportion of a lower alkyl acrylate, e.g., 2-ethylhexyl acrylate, methyl methacrylate or butyl acrylate. Heretofore, the all acrylic system has been used in premium quality paints as the emulsions have provided for good water resistance, desired leveling, film hardness, durability, scrubability, etc. The vinyl acetate-acrylic copolymer systems have been utilized in formulating interior flat and semi-gloss paints and exterior house paints, and the vinyl acetate-butyl acrylate latices result in paint films with excellent toughness, scrub resistance and durability, while the vinyl acetate-dibutyl maleate emulsions have good abrasion resistance and flexibility as well as durability.

Wet adhesion, i.e., the quality of adhering to a previously painted, aged surface under wet or moist conditions, has been imparted to both acrylic systems and vinyl acetate systems by polymerizing a wet adhesion monomer into the copolymer. Typically, these monomers have terminal olefinic unsaturation at one end, and a terminal ureido or urea functionality at the other end of the monomer. Although these monomers increase the ability of the emulsion to adhere to a previously painted film under moist conditions, these monomers sometimes have been difficult to polymerize into a system, particularly an acrylic system, and achieve other desired properties in the paints, thus wet adhesion of the paint vehicle is imparted by blending different kinds of acrylic polymer emulsions to obtain the overall properties desired in a paint vehicle, namely, durability, wet adhesion, scrubbability, flexibility, good leveling, abrasion resistance, toughness, etc.

Suitable emulsions include vinyl acetate latices. For interior and exterior usage, the vinyl acetate may be copolymerized with monomers copolymerizable therewith, i.e., lower alkyl acrylates, e.g., a C1-C6 ester of acrylic and methacrylic acid which includes methyl methacrylate, ethyl acrylate, butyl acrylate, 2-ethylhexyl acrylate; olefins, e.g., ethylene; alkyl esters of alpha-beta unsaturated dicarboxylic acids, e.g., dibutyl maleate, dibutyl fumarate, dioctyl maleate, dibutyl itaconate; vinyl chloride, vinyl esters, e.g., vinyl butyrate, vinyl propionate; vinyl ethers such as methylvinyl ether, n-butyl vinyl ether; and unsaturated carboxylic acids and amides, e.g., acrylic, and methacrylic acid, acrylamide and methacrylamide.

To achieve wet adhesion in the emulsion, which is required in most paint applications, a wet adhesion monomer may be interpolymerized with the vinyl acetate to form a vinyl acetate terpolymer. They can also be copolymerized with other monomers and blend with vinyl acetate copolymers to give wet adhesion. "Wet adhesion monomer", as used herein, is understood to mean those monomers having allylic or acrylic unsaturation in one portion of the molecule and pendant urea or acyclic and cyclic ureido functionality at the other end.

The latex may be present in the formulation in an amount of about 40 wt. % or greater, about 45 wt. % or greater, about 50 wt. % or greater, about 55 wt. % or greater, or about 60 wt. % or lower, about 65 wt. % or lower, about 70 wt. % or lower, or within any range using these endpoints, as a percentage of the total formulation.

The vinyl acetate may be present in the copolymer in an amount of about 25 wt. % or greater, about 35 wt. % or greater, about 45 wt. % or greater, about 55 wt. % or greater, about 65 wt. % or greater, about 75 wt. % or greater, or about 80 wt. % or lower, about 85 wt. % or lower, about 90 wt. % or lower, about 95 wt. % or lower, about 98 wt. % or lower, or within any range using these endpoints, as a percentage of the polymer weight.

A comonomer, such, a lower alkyl acrylate or olefin, may be present in the copolymer. The comonomer may be present in an amount of about 5 wt. % or greater, about 8 wt. % or greater, about 10 wt. % or greater, or about 12 wt. % or lower, about 15 wt. % or lower, about 17 wt. % or lower, about 20 wt. % or lower, or within any range using these endpoints, as a percentage of the polymer weight.

A wet adhesion monomer, such as a monomer having allylic or acrylic unsaturation in one portion of the molecule and pendant urea or acyclic and cyclic ureido functionality at the other end, may be included in the paint formulation. The wet adhesion monomer may be present in the paint formulation in an amount of about 0.2 wt. % or greater, about 0.4 wt. % or greater, about 0.8 wt. % or greater, about 1.0 wt. % or greater, about 1.2 wt. % or greater, or about 1.4 wt. % or lower, about 1.6 wt. % or lower, about 1.8 wt. % or lower, about 2.0 wt. % or lower, about 2.2 wt. % or lower, about 2.4 wt. % or lower, about 2.6 wt. % or lower, or within any range using these endpoints, as a percentage of the polymer weight.

With regard to a tetrapolymer, a suitable composition may include vinyl chloride, vinyl acetate, ethylene, and a wet adhesion monomer.

The vinyl chloride may be present in an amount of about 25 wt. % or greater, about 30 wt. % or greater, about 35 wt. % or greater, about 40 wt. % or greater, about 45 wt. % or greater, or about 50 wt. % or lower, about 55 wt. % or lower, about 60 wt. % or lower, about 65 wt. % or lower, or within any range using these endpoints, as a percentage of the total polymer weight.

The vinyl acetate may be present in an amount of about 30 wt. % or greater, about 35 wt. % or greater, about 40 wt. % or greater, about 45 wt. % or greater, or about 50 wt. % or lower, about 55 wt. % or lower, about 60 wt. % or lower, about 65 wt. % or lower, or within any range using these endpoints, as a percentage of the total polymer weight.

The ethylene may be present in an amount of about 10 wt. % or greater, about 11 wt. % or greater, about 12 wt. % or greater, or about 13 wt. % or lower, about 14 wt. % or lower, about 15 wt. % or lower, or within any range using these endpoints, as a percentage of the total polymer weight.

The wet adhesion monomer may be present in an amount of about 0.2 wt. % or greater, about 0.4 wt. % or greater, about 0.8 wt. % or greater, about 1.0 wt. % or greater, about 1.2 wt. % or greater, or about 1.4 wt. % or lower, about 1.6 wt. % or lower, about 1.8 wt. % or lower, about 2.0 wt. % or lower, about 2.2 wt. % or lower, about 2.4 wt. % or lower, about 2.6 wt. % or lower, or within any range using these endpoints, as a percentage of the polymer weight.

b. Alkyd Resins

The paint formulation may include one or more binders. Suitable binders include various types of alkyd resins. Exemplary alkyd resins include alkyd resins having short, medium, long, and very long oil length. The term "alkyd resin" also includes alkyds modified with other resins such as acrylic, epoxy, phenolic, urethane, polystyrene, silicone, rosin and rosin ester alkyds, and bio-alkyds, such as Setal 900 SM-90, in which the polyester segment is derived from renewable acids and esters.

The paint formulation may include binders in an amount of about 1 wt. % or greater, about 5 wt. % or greater, about 10 wt. % or greater, about 15 wt. % or greater, about 25 wt. % or greater, about 30 wt. % or greater, or about 35 wt. % or lower, about 40 wt. % or lower, about 50 wt. % or lower, about 60 wt. % or lower, or within any range using these endpoints, based on the total weight of the composition.

2. Surfactant

The paint formulations of the present invention comprise one or more surfactants, also referred to as the surfactant system. The surfactant system comprises at least one surfactant, which may be an amphoteric surfactant, a zwitterionic surfactant, a cationic surfactant, a nonionic surfactant, and optionally at least one other surfactant, which may be an amphoteric surfactant, a zwitterionic surfactant, a cationic surfactant, a nonionic surfactant, or a combination thereof. The surfactant system is present in the paint formulation to aid in stabilizing the emulsion.

Suitable surfactants for use in the paint formulations of the present disclosure include one or more surfactants and/or co-surfactants of Formula I:

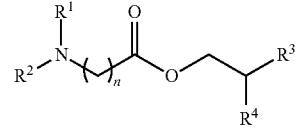

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C^{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate.

In particular, suitable surfactants or co-surfactants may include one or more of any of Surfactants 1-7 described herein.

The total amount of the one or more surfactants in the paint formulation may be about 0.5 wt. % or greater, about 1 wt. % or greater, about 2 wt. % or greater, or about 3 wt. % or lower, about 4 wt. % or lower, about 5 wt. % or lower, or within any range using these endpoints.

3. Drier

The paint formulation may include one or more driers. The driers are catalysts used to accelerate the drying process. Suitable driers may include oxidation catalysts such as cobalt or manganese salts, polymerization catalysts such as zirconium salts, and/or auxiliary catalysts such as calcium salts that control the film formation. Driers enable the paint to fully dry within a few hours, such as within three hours, two hours, or less, after application to a surface. Cobalt or manganese esters are oxidation catalysts that play a role in initiating the oxidation process, and include esters of $C_6$-$C_{19}$ branched fatty acids. Examples are Cobalt 2-ethylhexanoate, propionate, Neodecanoate, Naphthenate, Cobalt embedded polymer product called ECOS ND15 available from Umicore, Manganese Octoate, Manganese-amine complex called Nuodex Drycoat available from Huntsman.

The drier composition may be included in the paint formulation in an amount of about 0.1 wt. % or greater, about 0.3 wt. % or greater, about 0.6 wt. % or greater, or about 1.0 wt. % or lower, about 1.2 wt. % or lower, about 1.5 wt. % or lower, about 3.5 wt. % or lower, about 6.0 wt. % or lower, or within any range using these endpoints.

4. Pigments

The pigments used in a water-borne paint composition typically include an opacifying pigment, which imparts opacity or hiding to the paint film. The paint formulation of the present disclosure may include one or more pigments to color the composition and/or provide opacity to the composition. As used herein, pigment includes both inorganic metal oxides and organic color pigments. Suitable pigments include metal oxides such as titanium oxide and iron oxides, Zinc Chromates, Chromium oxides, Cadmium sulfides, Azurite (made from kaolin, Sodium carbonate, sulfur and carbon), Lithopone (zinc sulfide and Barium sulfate blend). Examples of organic color pigments are Phthalocyanine Blue (alpha & beta), Dinitraniline Orange (P0-5), Perylene Red, Toluidine Red (PR-3), Diarylide Yellow (PY-12,13) and Quinacridone Red (PV-19).

Pigments may be included in the paint composition in an amount of about 0 wt. % or greater, about 1 wt. % or greater, about 5 wt. % or greater, about 10 wt. % or greater, or about 15 wt. % or lower, about 20 wt. % or lower, about 25 wt. % or lower, about 30 wt. % or lower, or within any range using these endpoints.

5. Solvents

The paint formulation may include one or more aqueous or organic solvents like mineral spirits and alcohols. Suitable solvents include hydrocarbon solvent or their blends. The hydrocarbon solvents may be aliphatic or aromatic solvents. Examples of organic solvents are petroleum distillates such as pentane, hexane, petroleum naphtha, heptanes, and 90 solvent (an aliphatic solvent with a flash point of 140° F.). Aromatic solvents include xylene, toluene, Aromatic 100 and other suitable aromatic solvents. The term "mineral spirits", also known as "white spirits", encompasses compositions which comprise a mixture of C7 to C12 aliphatic and alicyclic hydrocarbons, and in a more particular embodiment comprises 15 wt. % to 20 wt. % or less of C7 to C12 aromatic hydrocarbons, based on the total weight of the composition. Mineral spirits include mixtures or blends of paraffins, cycloparaffins, and aromatic hydrocarbons. Typical mineral spirits have boiling ranges between about 150° C. and 220° C., are generally clear water-white liquids, are chemically stable and non-corrosive, and possess a mild odor. Exemplary mineral spirits include Low Aromatic White Spirit (LAWS) such as Shell Sol 15 (CAS 64742-88-7) and ShellSol H (CAS 64742-82-1). The term "alcohol" encompasses is intended to encompass C1 to C12 alcohols, including C1 to C12 straight chain and branched alcohols. Exemplary alcohols include triethylene glycol (CAS 112-27-6) and diethylene glycol ethylether (CAS 111-90-0). In a more particular embodiment, the coating composition comprises a solvent selected from the group consisting of xylene, mineral spirits, alcohol, water, and combinations thereof.

The amount of solvent in the paint formulation may be about 5 wt. % or greater, about 10 wt. % or greater, about 15 wt. % or greater, about 17 wt. % or greater, about 20 wt. % or greater, about 25 wt. % or greater, or about 30 wt. % or lower, about 40 wt. % or lower, about 60 wt. % or lower, or within any range using these endpoints.

6. Other Additives

The paint formulation may further include one or more additives such as fillers, pigments, surfactants, stabilizers, thickeners, emulsifiers, texture additives, adhesion promoters, biocides, flow promoters, dispersing agents, and additives to modify viscosity or finished appearance.

The additives may be included in the paint formulation in an amount of about 0.1 wt. % or greater, about 0.5 wt. % or greater, about 1.0 wt. % or greater, about 1.5 wt. % or greater, or about 2.0 wt. % or lower, about 5.0 wt. % or lower, about 10.0 wt. % or lower, about 20 wt. % or lower, about 25 wt. % or lower, about 30 wt. % or lower, or within any range using these endpoints.

The paint formulation may include one or more fillers to thicken and increase the volume of the composition. Suitable fillers include titanium oxide, calcium carbonate, clays, and talc.

The paint formulation may include one or more additives selected from the group consisting of surfactants, stabilizers, thickeners, emulsifiers, texture additives, adhesion promoters, biocides, and additives to modify viscosity or finished appearance.

7. Method of Making

The paint formulation may be synthesized by beginning with a standard premix of protective colloid, surfactant, and oxidizing agent. The monomer may be added thereafter, followed by additional surfactant and reducing agent.

The protective colloid may include hydroxyethyl cellulose, polyvinyl alcohol, casein, hydroxyethyl starch, and carboxymethyl cellulose.

The protective colloid may be added in an amount of about 0.05 wt. % or greater, about 0.1 wt. % or greater, about 0.5 wt. % or greater, about 1.0 wt. % or greater, about 1.5 wt. % or greater, about 2 wt. % or greater, or about 2.5 wt. % or lower, about 3.0 wt. % or lower, about 3.5 wt. % or lower, about 4.0 wt. % or lower, about 4.5 wt. % or lower, or within any range using these endpoints, of the weight of the monomer used in the synthesis.

The free radical initiating catalyst used to effect polymerization is commonly referred to as a redox catalyst. The redox catalysts, as known, comprise an oxidizing agent and reducing agent. The oxidizing and reducing components can be any of those conventionally used in vinyl acetate emulsion polymerization, such as hydrogen peroxide, potassium persulfate, t-butyl peroxypivalate, etc. and preferred reducing agents are ferrous ammonium sulfate and sodium or zinc formaldehyde sulfoxylate.

The premix may be formed by charging a primary vessel with water, the protective colloid, e.g., hydroxyethyl cellulose and the free radical initiation oxidizing agent in conventional amounts. Then, from about 0-70% of the total surfactant employed may be charged to the primary vessel and mixed therein. The remainder of the surfactant is mixed with the monomers in a secondary vessel or added separately. In either case, they may be added after a delay. To induce polymerization, the monomers and reducing agent may be added to the primary vessel over a period of time and at a rate such that the unreacted vinyl acetate in the primary vessel is maintained at about 3-5% by weight of the emulsion or latex. After all of the monomers are added to the primary vessel, the residual vinyl acetate then is reduced to less than 0.5% by addition of additional oxidizing agent and reducing agent. At the end of the polymerization, the pH may be adjusted to about 5.5 by addition of a base such as ammonium hydroxide.

With respect to the polymerization procedure, the protective colloid, particularly the cellulose ether, is used to maintain emulsion stability. Higher levels of colloid tend to enhance stability and in addition increase particle size. The surfactant also provides emulsion stability. But, in contrast to the colloid, surfactant tends to reduce particle size when present in the initial polymerization and exhibit better particle size affect when added as a delay. By working the protective colloid and surfactant together, particle size optimization can be achieved.

Agitation is another variable which can affect particle size in the polymer emulsion. Agitation should be mild so that appropriate heat transfer can be achieved, and product stability maintained. Vigorous agitation is to be avoided. In terms of particle size control, if larger particles are desired, the agitation rate can be reduced; and if smaller particles are required, the degree of agitation can be increased. If agitation cannot be modified, then surfactant or protective colloid adjustment may be made.

IV. Adhesive Formulation

The present disclosure further provides formulations of adhesives. The adhesive formulation of the present disclosure may be used in the manufacture of wood-based boards, such as plywood, scaleboard, blackboard, fiberboard, OBS board or equivalents.

The adhesive formulations of the present disclosure may include a resin, a filler, a solvent, and one or more surfactants chosen from one or more surfactant classes.

1. Resin

Resins are present in the adhesive formulation to function as the adhesive itself. Suitable resins may include phenol-formaldehyde resins, urea-formaldehyde resins, amino resins or other corresponding resins. In an embodiment, the resin used is UF (urea-formaldehyde resin), MUF (melamine urea-formaldehyde), MUFP (modified urea-formaldehyde polymer), PF (phenol-formaldehyde), or a derivative or mixture of these or equivalent.

The resin may be present in the adhesive formulation in an amount of about 40 wt. % or greater, about 45 wt. % or greater, about 50 wt. % or greater, about 55 wt. % or greater, or about 60 wt. % or lower, about 65 wt. % or lower, about 70 wt. % or lower, about 75 wt. % or lower, about 80 wt. % or lower, or within any range using these endpoints.

2. Filler

As used herein, "filler" refers to a filling agent or hardener known in itself or to a mixture of these. The hardener effects the hardening of the glue in the application, i.e. during the manufacturing of wood-based boards, often preferably together with heat of compression. Suitable fillers may include starch, wheat flower, chalk, sodium carbonate, potassium carbonate, calcium carbonate, ammonium sulfate, wood powder, quebracho or a derivative of these or a mixture of these or equivalent. Quebracho means the hard wood material of certain South-American broadleaf trees. As used herein, "chalk" refers to loose-structured, light and crumbling limestone.

The filler may be present in the adhesive composition in an amount of about 5 wt. % or greater, about 10 wt. % or greater, about 15 wt. % or greater, or about 20 wt. % or lower, about 25 wt. % or lower, about 30 wt. % or lower, or within any range using these endpoints.

3. Solvent

The adhesive formulation may include a solvent, such as water. The water may be obtained from outside the process or it may be water circulated from within the process, i.e. process wash water. Alternatively, the solvent may be an organic solvent.

The solvent may be present in the adhesive composition in an amount of about 0 wt. % or greater, about 5 wt. % or greater, about 10 wt. % or greater, about 15 wt. % or greater, about 20 wt. % or greater, or about 25 wt. % or lower, about 30 wt. % or lower, about 35 wt. % or lower, about 40 wt. % or lower, or within any range using these endpoints.

4. Surfactant

One or more surfactants may be included in the adhesive formulations as foaming agents, with the express purpose of promoting foaming. Suitable surfactants for use in the adhesive formulations of the present disclosure include one or more surfactants and/or co-surfactants of Formula I:

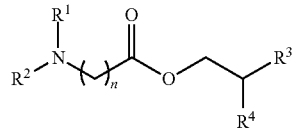

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C^{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate.

In particular, suitable surfactants or co-surfactants may include one or more of any of Surfactants 1-7 described herein.

The adhesive formulations may include one or more surfactants in an amount of about 0.1 wt. % or greater, about 0.5 wt. % or greater, about 1 wt. % or greater, about 2 wt. % or greater, about 3 wt. % or greater, about 4 wt. % or greater, or about 5 wt. % or lower, about 6 wt. % or lower, about 7 wt. % or lower, about 8 wt. % or lower, about 9 wt. % or lower, about 10 wt. % or lower, or within any range using these endpoints.

5. Other Additives

The adhesive formulation may include one or more additional compatible ingredients. These additional ingredients may include, for example, one or more additional surfactants not intended purely for the purposes of foaming, such as the surfactants of the present disclosure. These additional surfactants may be present in the adhesive formulation in an amount of about 0.1 wt. % or greater, about 0.5 wt. % or greater, or about 1.0 wt. % or lower, about 1.5 wt. % or lower, about 2.0 wt. % or lower, or within any range using these endpoints.

The adhesive composition may also include a catalyst.

6. Method of Making

The adhesive formulation may be prepared as an emulsion. To prepare the emulsion, the liquid components may be mixed together, and the mixture may be cooked at a relatively high temperature (over 40° C.).

V. Paint Stripping Formulation

The present disclosure also provides formulations of paint strippers. The present compositions can be used to remove adhesives, sealants, and other organic coatings such as enamel, varnish or lacquer, or other organic coatings from various substrates, including metal substrates such as aluminum and aluminum alloys. Generally, the compositions are in contact with the surface for a period of time sufficient to produce a blistering of the polymeric coating, after which time, the blistered coating can be removed with an abrasive material. Alternatively, the coating can be removed by lifting the blistered coating off of the surface by spraying the blistered coating with water.

The paint stripping formulations of the present disclosure may include dichloroethylene, one or more surfactants chosen from one or more surfactant classes, one or more co-solvents, corrosion inhibitors, wax, thickeners, organic solvents and water.

1. Dichloroethylene

The stripping formulation may include dichloroethylene (1,1-dichloroethylene, cis-1,2-dichloroethylene, trans-1,2-dichloroethylene, or mixtures thereof).

The dichloroethylene may be present in the stripping formulation in amount of about 55 wt. % or greater, about 57 wt. % or greater, about 59 wt. % or greater, or about 61 wt. % or lower, about 63 wt. % or lower, about 65 wt. % or lower, or within any range using these endpoints.

2. Surfactants

Surfactants may be included in the stripping formulation in order to increase solubility of certain components.

Suitable surfactants for use in the stripping formulations of the present disclosure include one or more surfactants and/or co-surfactants of Formula I:

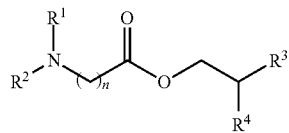

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate.

In particular, suitable surfactants or co-surfactants may include one or more of any of Surfactants 1-7 described herein.

The surfactant may be present in the stripping formulation in an amount of about 1 wt. % or greater, about 2 wt. % or greater, about 3 wt. % or greater, about 4 wt. % or greater, about 5 wt. % or greater, or about 6 wt. % or lower, about 7 wt. % or lower, about 8 wt. % or lower, about 9 wt. % or lower, about 10 wt. % or lower, or within any range using these endpoints.

3. Co-Solvent

Co-solvents may be used to increase swelling of the target paint. The stripping formulation of the present disclosure may include such co-solvents. Suitable solvents may include aromatic alcohols and aromatic ethers, such as diphenoxybenzene, propoxybenzene, methoxybenzene, ethoxybenzene, benzyl ether, diphenyl ether, cyclopentanol, naphthalenol, phenylcarbinol, tolyl alcohol, mellityl alcohol, and other aromatic alcohols that contain a hydroxyl group in a side chain of an aromatic ring. Other suitable solvents may include aliphatic alcohols, ethanol, propanal, butanol, pentanol, hexanol and alcohols having up to 12 carbons. Such co-solvents are generally considered environmentally friendly and non-toxic, and may be effective co-solvents without the need for additional activators for stripping formulations including 1,2-dichloroethylene.

Aromatic alcohols and aromatic ethers may be present in the stripping formulation in an amount of about 10 wt. % or greater, about 11 wt. % or greater, about 12 wt. % or greater, about 13 wt. % or greater, about 14 wt. % or greater, about 15 wt. % or greater, or about 16 wt. % or lower, about 17 wt. % or lower, about 18 wt. % or lower, about 19 wt. % or lower, about 20 wt. % or lower, or within any range using these endpoints.

The aliphatic alcohols may be present in the stripping formulation in an amount of about 1 wt. % or greater, about 2 wt. % or greater, about 3 wt. % or greater, about 4 wt. % or greater, about 5 wt. % or greater, or about 6 wt. % or lower, about 7 wt. % or lower, about 8 wt. % or lower, about 9 wt. % or lower, about 10 wt. % or lower, or within any range using these endpoints.

4. Corrosion Inhibitors

The stripping formulations of the present disclosure may include corrosion inhibitors. Suitable corrosion inhibitors may include benzimidazoles, benzazoles, benzoxazoles, and mixtures of these corrosion inhibitors, as well as triazoles such as benzotriazole and tolytriazole.

The corrosion inhibitors may be included in the stripping formulation in effective amounts of about 0 wt. % or greater, about 1 wt. % or greater, about 2 wt. % or greater, about 3 wt. % or greater, about 4 wt. % or greater, about 5 wt. % or greater, or about 6 wt. % or lower, about 7 wt. % or lower, about 8 wt. % or lower, about 9 wt. % or lower, about 10 wt. % or lower, or within any range using these endpoints.

5. Wax

The stripping formulations of the present disclosure may include waxes. Suitable waxes include paraffin wax. To facilitate mixing with other components of the stripping formulation, the wax may be dissolved in a solvent prior to mixing with other components. Solvents that are substantially non-polar or oleophilic solvents can be used for this purpose. Suitable solvents include aromatic and aliphatic hydrocarbons, such as benzene, toluene, xylenes, hexane, cyclohexane, heptanes, octanes, and similar straight and branched hydrocarbons and mixtures thereof. Included are the fractions from the distillation of petroleum mineral spirits and various mixtures of these solvents.

The wax may be present in the stripping formulation in an amount of about 1.0 wt. % or greater, 1.5 wt. % or greater, 2.0 wt. % or greater, 2.5 wt. % or greater, or 3.0 wt. % or lower, 3.5 wt. % or lower, 4.0 wt. % or lower, 4.5 wt. % or lower, or 5.0 wt. % or lower, or within any range using these endpoints.

6. Thickener

The stripping formulation of the present disclosure may include thickeners. In applications wherein vertical surfaces are to be treated with the formulation, thickening agents can be used to retain the formulation on the coating surface for an extended time sufficient to loosen the coating. Suitable thickeners may include cellulose such as ethyl cellulose, ethyl hydroxyethyl cellulose, methyl cellulose, colloidal silica, days such as bentonite, starch colloidal alumina or gum arabic.

The thickener may be present in the stripping formulation in an amount of 0 wt. % or greater, 1.0 wt. % or greater, 1.5 wt. % or greater, 2.0 wt. % or greater, 2.5 wt. % or greater, or 3.0 wt. % or lower, 3.5 wt. % or lower, 4.0 wt. % or lower, 4.5 wt. % or lower, or 5.0 wt. % or lower, or within any range using these endpoints.

7. Solvents

The stripping formulation of the present disclosure may include additional solvents, such as organic solvents and water.

An organic solvent may be present in the stripping formulation in an amount of about 1.0 wt. % or greater, 1.5 wt. % or greater, 2.0 wt. % or greater, 2.5 wt. % or greater, or 3.0 wt. % or lower, 3.5 wt. % or lower, 4.0 wt. % or lower, 4.5 wt. % or lower, or 5.0 wt. % or lower, or within any range using these endpoints.

Water may be present in the stripping formulation in an amount of about 1 wt. % or greater, about 5 wt. % or greater, about 8 wt. % or greater, about 10 wt. % or greater, or about 12 wt. % or lower, about 15 wt. % or lower, about 18 wt. % or lower, about 20 wt. % or lower, or within any range using these endpoints.

8. Method of Use

The stripping formulations of the present disclosure are generally applied to the surface to be stripped in the usual manner, i.e., the compositions are applied by brush, or other applicator and then applied to the surface to be stripped. Alternatively, the formulations may be sprayed onto a surface using spraying system, such system taking advantage of the thixotropic characteristics of the formulations on vertical panels.

VI. Surfactants

The present disclosure provides surfactants for use in inks, paints, adhesive, and paint strippers in the form of derivatives of amino acids. The amino acids may be naturally occurring or synthetic, or they may be obtained from ring-opening reactions of lactams, such as caprolactam. The compounds of the present disclosure have been shown to have surface-active properties, and may be used as surfactants and wetting agents, for example. In particular, the present disclosure provides compounds of Formula I:

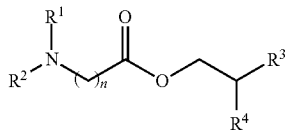

Formula I wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; and an optional counterion may be associated with the compound and, if present, the counterion may be selected from the group consisting of chloride, bromide, iodide, and 4-methylbenzenesulfonate.

One specific compound (Surfactant 1) provided by the present disclosure is 6-((2-butyloctyl)oxy)-N,N,N-trimethyl-6-oxohexan-1-aminium iodide, having the following formula:

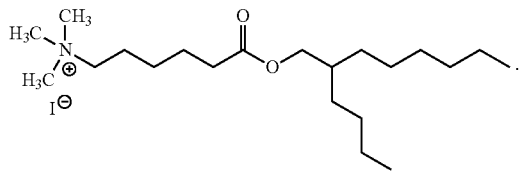 [SMILES: CCCCCCC(CCCC)COC(=O)CCCCC[N+](C)(C)C ; [I-]]

A second specific compound (Surfactant 2) provided by the present disclosure is 6-((2-butyloctyl)oxy)-N,N-dimethyl-6-oxohexan-1-aminium 4-methylbenzenesulfonate, having the following formula:

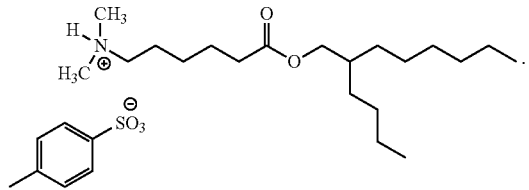

A third specific compound (Surfactant 3) provided by the present disclosure is 6-((2-butyloctyl)oxy)-N,N-dimethyl-6-oxohexan-1-aminium chloride, having the following formula:

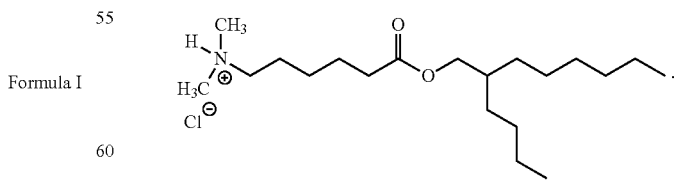

A fourth specific compound (Surfactant 4) provided by the present disclosure is 4-((6-((2-butyloctyl)oxy)-6-oxohexyl)dimethylammonio)butane-1-sulfonate, having the following formula:

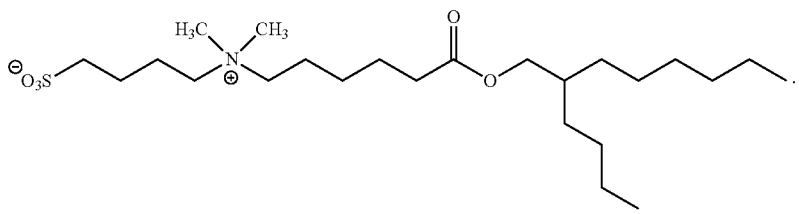

A fifth specific compound (Surfactant 5) provided by the present disclosure is 2-butyloctyl 6-(dimethylamino)hexanoate N-oxide, having the following formula:

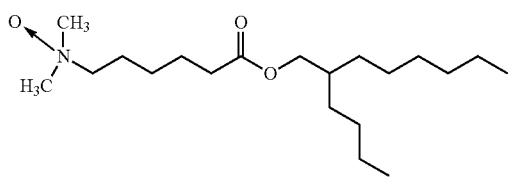

A sixth specific compound (Surfactant 6) provided by the present disclosure is 6-((2-butyloctyl)oxy)-6-oxohexan-1-aminium chloride, having the following formula:

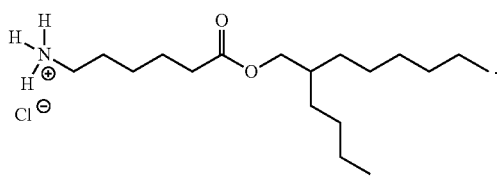 [SMILES: CCCCCCC(CCCC)COC(=O)CCCCC[NH3+] ; [Cl-]]

A seventh specific compound (Surfactant 7) provided by the present disclosure is 6-((2-butyloctyl)oxy)-6-oxohexan-1-aminium 4-methylbenzenesulfonate, having the following formula:

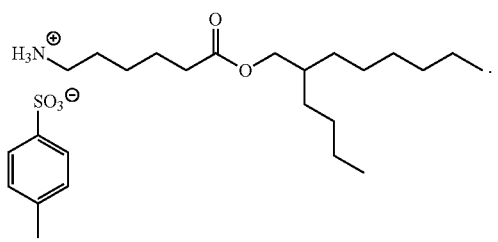

These surfactants may be synthesized by various methods. One such method includes opening a lactam to yield an amino acid having an N-terminus and C-terminus. The N-terminus may be reacted with one or more alkylating agents and/or an acid to yield a quaternary ammonium salt. Alternatively, the N-terminus may be reacted with an oxidizing agent to yield an amine N-oxide. The C-terminus may be reacted with an alcohol in the presence of an acid to yield an ester.

The amino acid may be naturally occurring or synthetic or may be derived from a ring opening reaction of a lactam, such as caprolactam. The ring-opening reaction may be either an acid or alkali catalyzed reaction, and an example of an acid catalyzed reaction is shown below in Scheme 1.

SCHEME 1

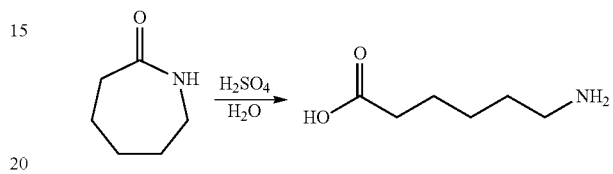

The amino acid may have as few as 1 or as many as 12 carbons between the N- and C-termini. The alkyl chain may be branched or straight. The alkyl chain may be interrupted with nitrogen, oxygen, or sulfur. The alkyl chain may be further substituted with one or more substituents selected from the group consisting of hydroxyl, amino, amido, sulfonyl, sulfonate, carboxyl, and carboxylate. The N-terminal nitrogen may be acylated or alkylated with one or more alkyl groups. For example, the amino acid may be 6-(dimethylamino)hexanoic acid or 6-aminohexanoic acid.

Surfactant 1 may be synthesized as shown below in Scheme 2. As shown, the N-terminus of 2-butyloctyl 6-(dimethylamino)hexanoate is alkylated with methyl iodide in the presence of sodium carbonate.

SCHEME 2

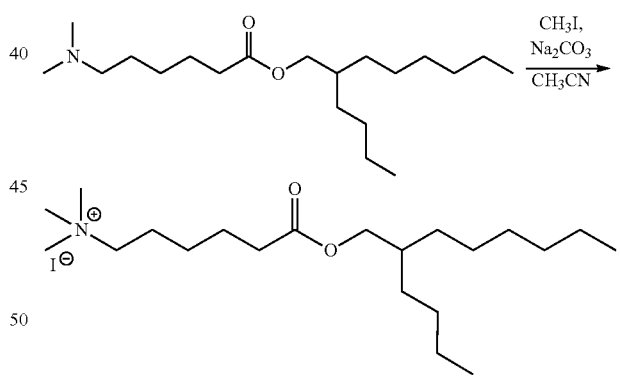

Surfactant 2 may be synthesized as shown below in Scheme 3. As shown, the C-terminus of 6-(dimethylamino)hexanoic acid is treated with 2-butyloctanol in the presence of p-toluenesulfonic acid (PTSA) in toluene to give the corresponding ester, 2-butyloctyl 6-(dimethylamino)hexanoate as the 4-methylbenzenesulfonate salt.

SCHEME 3

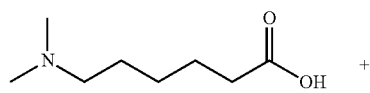

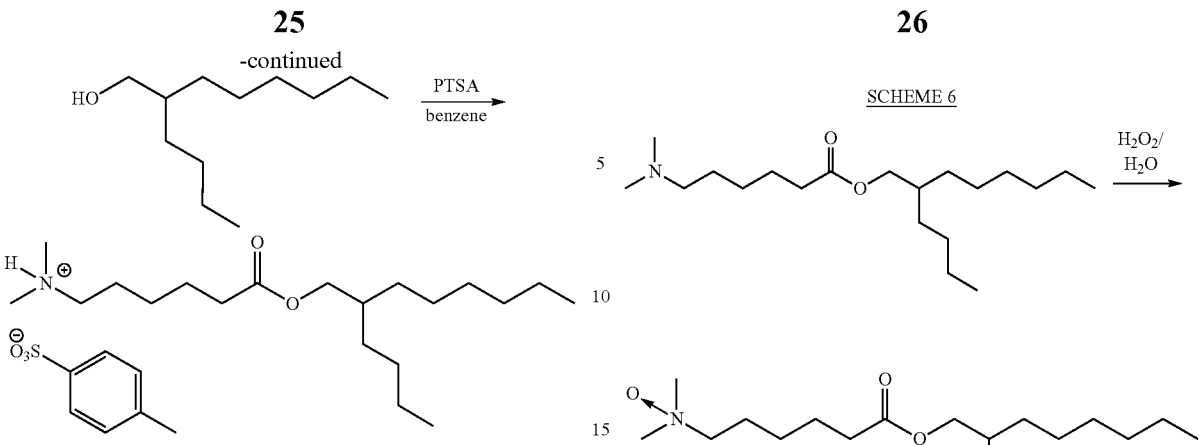

Surfactant 3 may be synthesized as shown below in Scheme 4. As shown, 2-butyloctyl 6-(dimethylamino) hexanoate is treated with one equivalent of hydrochloric acid to give 2-butyloctyl 6-(dimethylamino)hexanoate as the chloride salt.

SCHEME 4

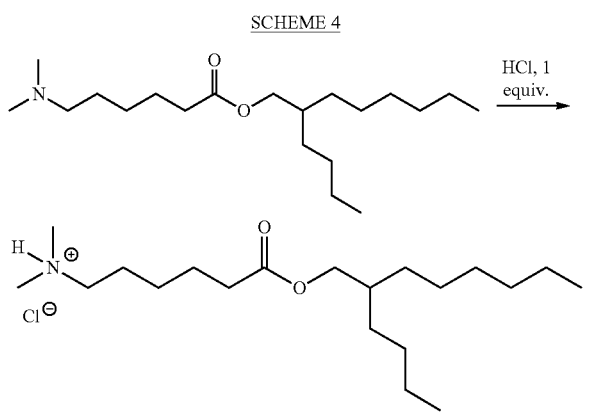

Surfactant 4 may be synthesized as shown below in Scheme 5. As shown, the N-terminus of 2-butyloctyl 6-(dimethylamino)hexanoate is treated with 1,4-butanesultone in refluxing ethyl acetate to yield the desired sulfonate.

SCHEME 5

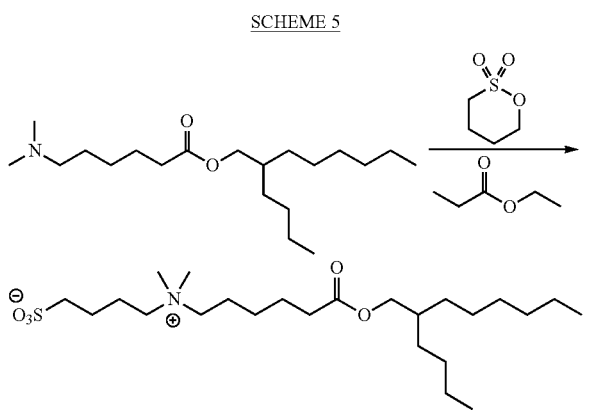

Surfactant 5 may be synthesized as shown below in Scheme 6. As shown, the N-terminus of the N-terminus of 2-butyloctyl 6-(dimethylamino)hexanoate is treated with hydrogen peroxide in water to provide the desired N-oxide.

SCHEME 6

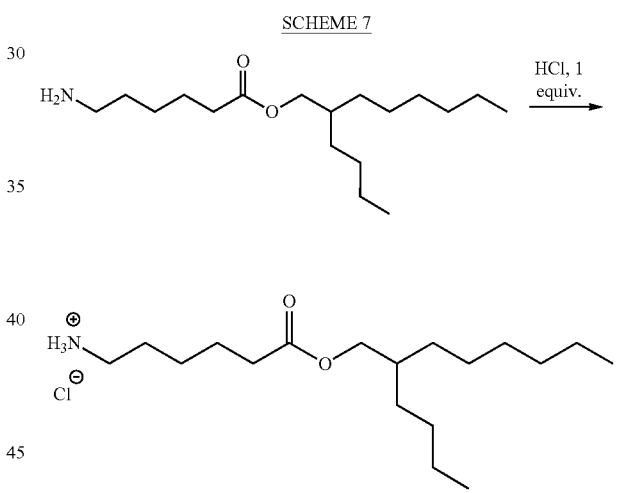

Surfactant 6 may be synthesized as shown below in Scheme 7. As shown, the N-terminus of 2-butyloctyl 6-aminohexanoate is treated with one equivalent of hydrochloric acid to provide the corresponding chloride salt.

SCHEME 7

Surfactant 7 may be synthesized as shown below in Scheme 8. As shown, 6-aminohexanoic acid is treated with 2-butyloctanol and p-toluenesulfonic acid (PTSA) in benzene to provide the corresponding 4-methylbenzenesulfonate salt.

SCHEME 8

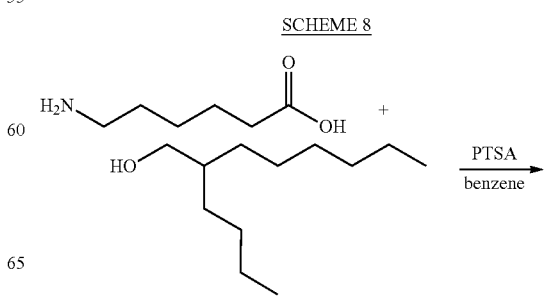

-continued

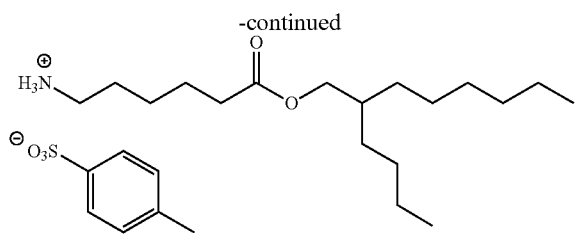

The compounds of the present disclosure demonstrate surface-active properties. These properties may be measured and described by various methods. One method by which surfactants may be described is by the molecule's critical micelle concentration (CMC). CMC may be defined as the concentration of a surfactant at which micelles form, and above which all additional surfactant is incorporated into micelles.

As surfactant concentration increases, surface tension decreases. Once the surface is completely overlaid with surfactant molecules, micelles begin to form. This point represents the CMC, as well as the minimum surface tension. Further addition of surfactant will not further affect the surface tension. CMC may therefore be measured by observing the change in surface tension as a function of surfactant concentration. One such method for measuring this value is the Wilhemy plate method. A Wilhelmy plate is usually a thin iridium-platinum plate attached to a balance by a wire and placed perpendicularly to the air-liquid interface. The balance is used to measure the force exerted on the plate by wetting. This value is then used to calculate the surface tension (γ) according to Equation 1:

$$\gamma = F/l \cos \theta \qquad \text{Equation 1:}$$

wherein l is equal to the wetted perimeter (2w+2d, in which w and d are the plate thickness and width, respectively) and cos θ, the contact angle between the liquid and the plate, is assumed to be 0 in the absence of an extant literature value.

Another parameter used to assess the performance of surfactants is dynamic surface tension. The dynamic surface tension is the value of the surface tension for a particular surface or interface age. In the case of liquids with added surfactants, this can differ from the equilibrium value. Immediately after a surface is produced, the surface tension is equal to that of the pure liquid. As described above, surfactants reduce surface tension; therefore, the surface tension drops until an equilibrium value is reached. The time required for equilibrium to be reached depends on the diffusion rate and the adsorption rate of the surfactant.

One method by which dynamic surface tension is measured relies upon a bubble pressure tensiometer. This device measures the maximum internal pressure of a gas bubble that is formed in a liquid by means of a capillary. The measured value corresponds to the surface tension at a certain surface age, the time from the start of the bubble formation to the occurrence of the pressure maximum. The dependence of surface tension on surface age can be measured by varying the speed at which bubbles are produced.

Surface-active compounds may also be assessed by their wetting ability on solid substrates as measured by the contact angle. When a liquid droplet comes in contact with a solid surface in a third medium, such as air, a three-phase line forms among the liquid, the gas and the solid. The angle between the surface tension unit vector, acting at the three-phase line and tangent at the liquid droplet, and the surface is described as the contact angle. The contact angle (also known as wetting angle) is a measure of the wettability of a solid by a liquid. In the case of complete wetting, the liquid is completely spread over the solid and the contact angle is 0°. Wetting properties are typically measured for a given compound at the concentration of 1-10×CMC, however, it is not a property that is concentration-dependent therefore measurements of wetting properties can be measured at concentrations that are higher or lower.

In one method, an optical contact angle goniometer may be used to measure the contact angle. This device uses a digital camera and software to extract the contact angle by analyze the contour shape of a sessile droplet of liquid on a surface.

Potential applications for the surface-active compounds of the present disclosure include formulations for use as shampoos, hair conditioners, detergents, spot-free rinsing solutions, floor and carpet cleaners, cleaning agents for graffiti removal, wetting agents for crop protection, adjuvants for crop protection, and wetting agents for aerosol spray coatings.

It will be understood by one skilled in the art that small differences between compounds may lead to substantially different surfactant properties, such that different compounds may be used with different substrates, in different applications.

The following non-limiting embodiments are provided to demonstrate the different properties of the different surfactants. In Table 1 below, short names for the surfactants are correlated with their corresponding chemical structures.

TABLE 1

| Surfactant | Formula & Name |
|---|---|
| Surfactant 1 | 6((2-butyloctypoxy)-N,N,N-trimethyl-6-oxohexan-1-aminium iodide |

TABLE 1-continued

| Surfactant | Formula & Name |
|---|---|
| Surfactant 2 | 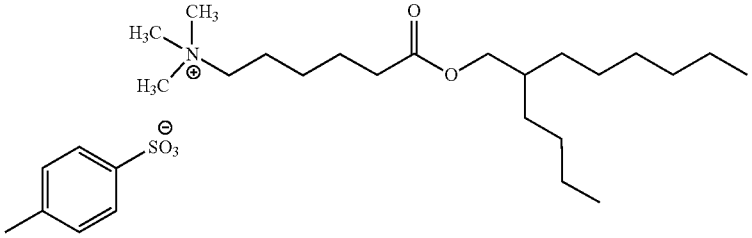<br>6-((2-butyloctyl)oxy)-N,N-dimethyl-6-oxohexan-1-aminium 4-methylbenzenesulfonate |
| Surfactant 3 | 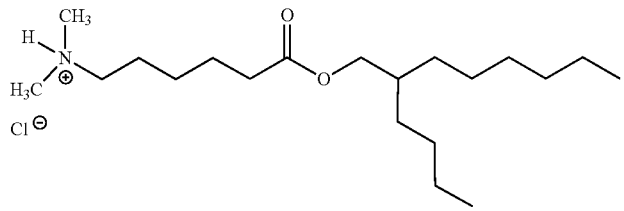<br>6-((2-butyloctyl)oxy)-N,N-dimethyl-6-oxohexan-1-aminium chloride |
| Surfactant 4 | 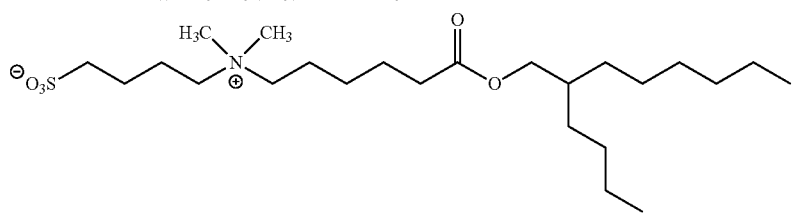<br>4-((6-((2-butyloctyl)oxy)-6-oxohexyl)dimethylammonio)butane-1-sulfonate |
| Surfactant 5 | 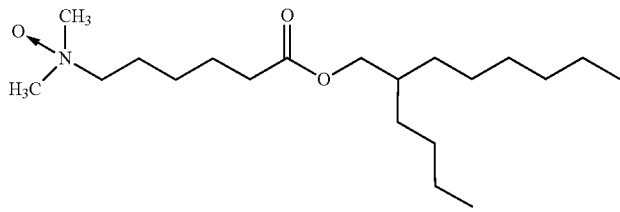 [SMILES: CCCCCCC(CCCC)COC(=O)CCCCC[N+](C)(C)[O-]]<br>2-butyloctyl 6-(dimethylamino)hexanoate N-oxide |
| Surfactant 6 | 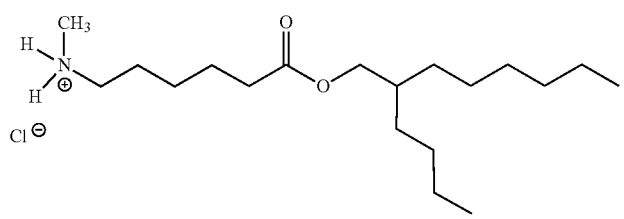 [SMILES: [Cl-] ; CCCCCCC(CCCC)COC(=O)CCCCC[NH2+]C]<br>6-((2-butyloctyl)oxy)-6-oxohexan-1-aminium chloride |
| Surfactant 7 | 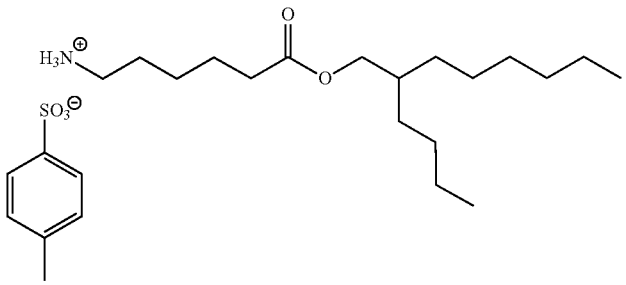<br>6-((2-butyloctyl)oxy)-6-oxohexan-1-aminium 4-methylbenzenesulfonate |

Each of the seven compounds are effective as surface-active agents, useful for wetting or foaming agents, dispersants, emulsifiers, and detergents, among other applications.

Surfactant 1, Surfactant 2, Surfactant 3, Surfactant 6, and Surfactant 7 are cationic. These surfactants are useful in both the applications described above and some further special applications such as surface treatments, such as in personal hair care products, and can also be used to generate water repellant surfaces.

Surfactant 4 is zwitterionic. These surfactants are useful as co-surfactants in all of the applications described above.

Surfactant 5 is non-ionic, and can be used in shampoos, detergents, hard surface cleaners, and a variety of other surface cleaning formulations.

EXAMPLES

Nuclear magnetic resonance (NMR) spectroscopy was performed on a Bruker 500 MHz spectrometer. The critical micelle concentration (CMC) was determined by the Wilhelmy plate method at 23° C. with a tensiometer (DCAT 11, DataPhysics Instruments GmbH) equipped with a Pt—Ir plate. Dynamic surface tension was determined with a bubble pressure tensiometer (Krüss BP100, Krüss GmbH), at 23° C. Contact angle was determined with the optical contact angle goniometer (OCA 15 Pro, DataPhysics GmbH) equipped with a digital camera.

Example 1a

Synthesis of 6-((2-butyloctyl)oxy)-N,N,N-trimethyl-6-oxohexan-1-aminium Iodide

2-Butyloctyl 6-(dimethylamino)hexanoate (2.04 mmol, 700 mg) was dissolved in acetonitrile (10 mL). Sodium carbonate (2.44 mmol, 259 mg) was added, and the mixture was stirred at room temperature for 10 minutes. Methyl iodide (6.12 mmol, 0.38 mL) was added, and the mixture was heated to 40° C. for 24 hours before cooling to room temperature. The mixture was filtered and the solvent was removed under vacuum to give 6-((2-butyloctyl)oxy)-N,N,N-trimethyl-6-oxohexan-1-aminium iodide as a yellow solid in 90% yield. $^1$H NMR (500 MHz, DMSO) δ 3.93 (d, J=5.7 Hz, 2H), 3.29-3.22 (m, 2H), 3.04 (s, 9H), 2.34 (t, J=7.4 Hz, 2H), 1.73-1.53 (m, 5H), 1.33-1.25 (m, 18H), 0.88-0.85 (m, 6H).

Example 1b

Determination of Critical Micelle Concentration (CMC)

The critical micelle concentration (CMC) of the 6-((2-butyloctyl)oxy)-N,N,N-trimethyl-6-oxohexan-1-aminium iodide from Example 1a was tested. From the plot of the results show in FIG. 1, a CMC value could not be clearly determined at concentrations as high as 10 mg/mL, with the surface tension asymptotically approaching a value of about 27 mN/m. FIG. 1 is a plot of these results, showing surface tension versus concentration. From the plot of the results, the surface tension at the CMC is equal to or less than about 27 mN/m.

Example 2a

Synthesis of 6-((2-butyloctyl)oxy)-N,N-dimethyl-6-oxohexan-1-aminium 4-methylbenzenesulfonate 6-(Dimethylamino)hexanoic acid was treated with 2-butyloctan-1-ol and p-toluenesulfonic acid in benzene for 12 hours at 120° C. 6-((2-Butyloctyl)oxy)-N,N-dimethyl-6-oxohexan-1-aminium 4-methylbenzenesulfonate was isolated as a white waxy solid and recrystallized from acetone in 49% yield. $^1$H NMR (500 MHz, DMSO) δ 7.48 (dd, J=8.4, 0.6 Hz, 2H), 7.12 (dd, J=8.4, 0.6 Hz, 1H), 3.93 (d, J=5.7 Hz, 2H), 3.02-3.00 (m, 2H), 2.76 (d, J=5.0 Hz, 6H), 2.37-2.25 (m, 6H), 1.59-1.53 (m, 5H), 1.25-1.29 (m, 18H), 0.87 (td, J=6.8, 2.7 Hz, 6H).

Example 2b

Determination of Critical Micelle Concentration (CMC)

Figure 2A:
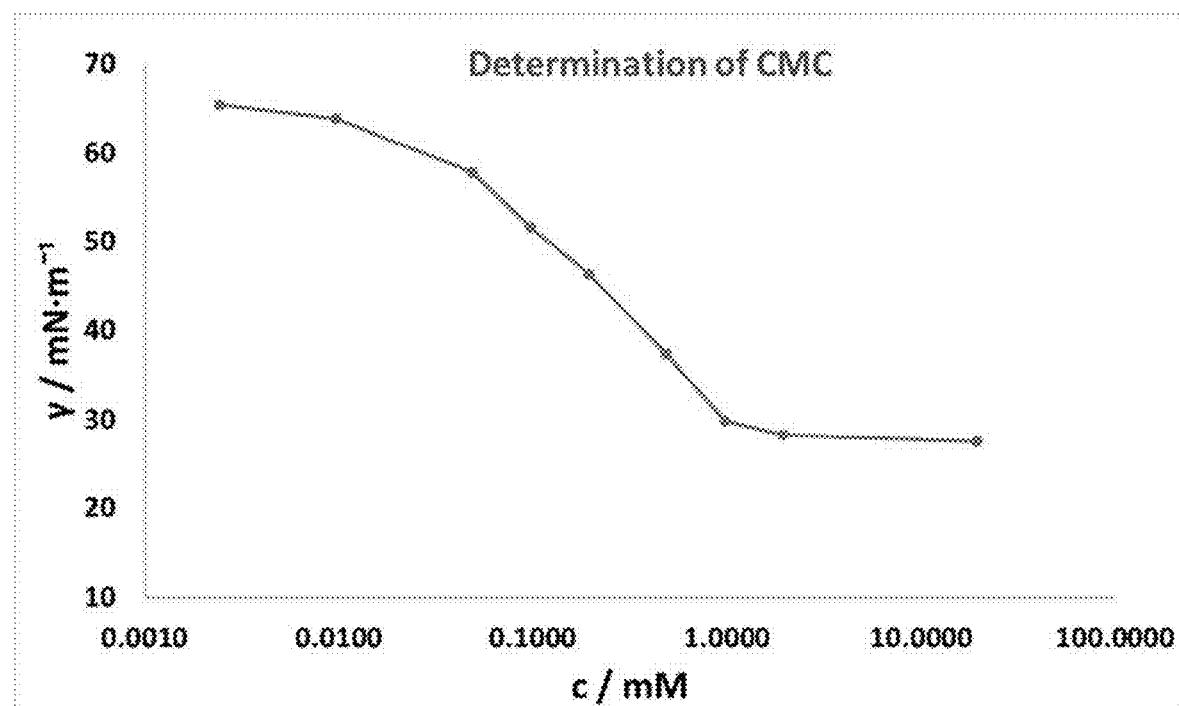
FIG. 2A shows a plot of surface tension versus concentration measured at pH=7 as described in Example 2B, wherein the Y axis depicts the surface tension (γ) in millinewtons per meter (mN/m) and the X axis depicts the concentration (c) in millimoles (mM).

The critical micelle concentration (CMC) of the 6-((2-butyloctyl)oxy)-N,N-dimethyl-6-oxohexan-1-aminium 4-methylbenzenesulfonate from Example 2a was tested. From the change in surface tension with concentration in water, the CMC was determined to be about 0.97 mmol. The plateau value of minimum surface tension that can be reached by this surfactant is about 27 mN/m, namely 27 mN/m±3 mN/m. FIG. 2A is a plot of these results, showing surface tension versus concentration. From the plot of the results, the surface tension at the CMC is equal to or less than about 30 mN/m.

Example 2c

Determination of Dynamic Surface Tension

Figure 2B:
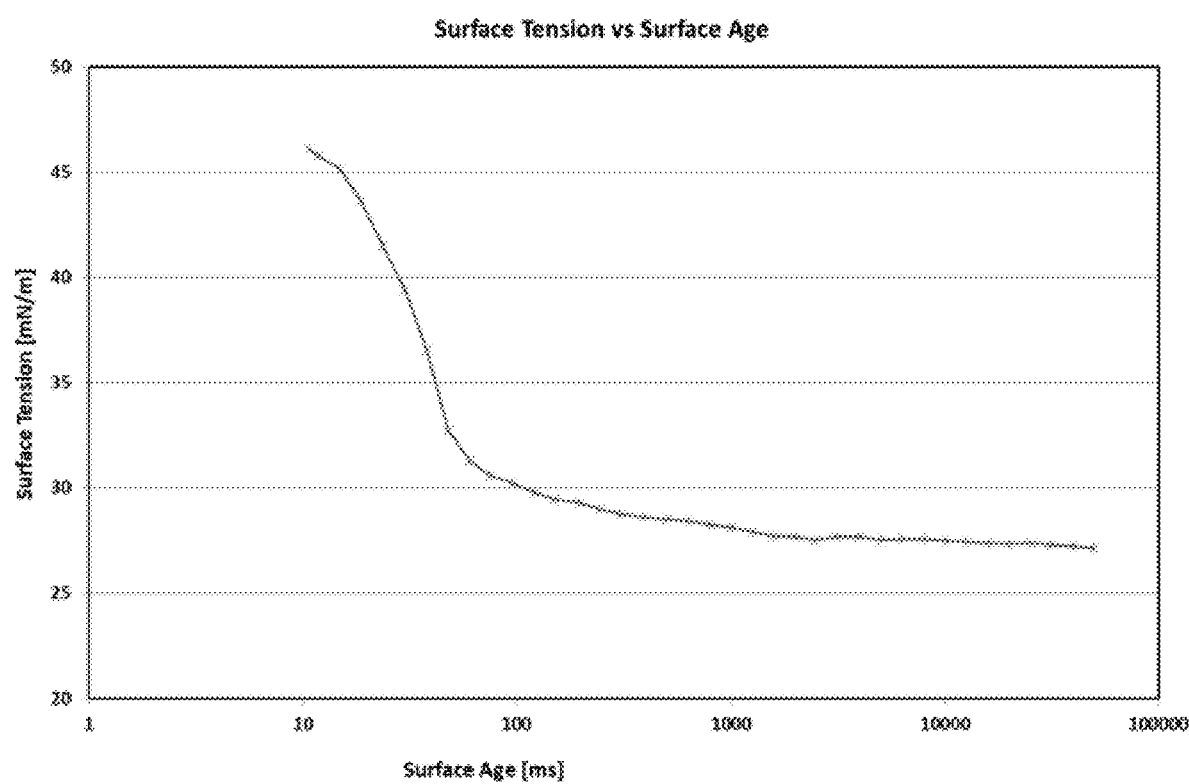
FIG. 2B shows a plot of dynamic surface tension as change in surface tension versus time as described in Example 2C, wherein the Y axis depicts the surface tension in millinewtons per meter (mN/m) and the X axis depicts the surface age in milliseconds (ms).

The dynamic surface tension of the 6-((2-butyloctyl)oxy)-N,N-dimethyl-6-oxohexan-1-aminium 4-methylbenzenesulfonate from Example 2a was determined with a bubble pressure tensiometer which measures the change of surface tension of a freshly created air-water interface with time. FIG. 2B presents a plot of the surface tension versus time, showing that surface tension in the time interval between 10 and 100 ms drops rapidly from about 46 mN/m to about 30 mN/m. In the time interval from 100 to 8,000 ms, the surface tension drops slowly from 30 mN/m to about 27 mN/m, approaching asymptotically the saturation value of the surface tension at the CMC.

Example 2d

Determination of Wetting Properties

In addition to surface tension and surface dynamics, the wetting properties of the 6-((2-butyloctyl)oxy)-N,N-dimethyl-6-oxohexan-1-aminium 4-methylbenzenesulfonate from Example 2a were tested on various surfaces. For example, hydrophobic substrates such as polyethylene-HD exhibit surface wetting with a contact angle of 24.3°. On oleophobic and hydrophobic substrates such as Teflon, the measured contact angle was much less than that of water's contact angle of 119°, at 48.2° (Table 2).

TABLE 2

| Substrate | CA of Surfactant (°) | Concentration | CA of water (°) |
|---|---|---|---|
| Teflon | 48.2 | 10x CMC | 119 |
| Polyethylene-HD | 24.3 | 10x CMC | 93.6 |
| Nylon | 13.5 | 10x CMC | 50 |
| Polyethylene terephthalate | 7.7 | 10x CMC | 65.3 |

Example 3a

Synthesis of 6-((2-butyloctyl)oxy)-N,N-dimethyl-6-oxohexan-1-aminium Chloride

2-Butyloctyl 6-(dimethylamino)hexanoate was treated with one equivalent of hydrochloric acid to provide 6-((2-butyloctyl)oxy)-N,N-dimethyl-6-oxohexan-1-aminium chloride.

Example 3b

Determination of Critical Micelle Concentration (CMC)

Figure 3:
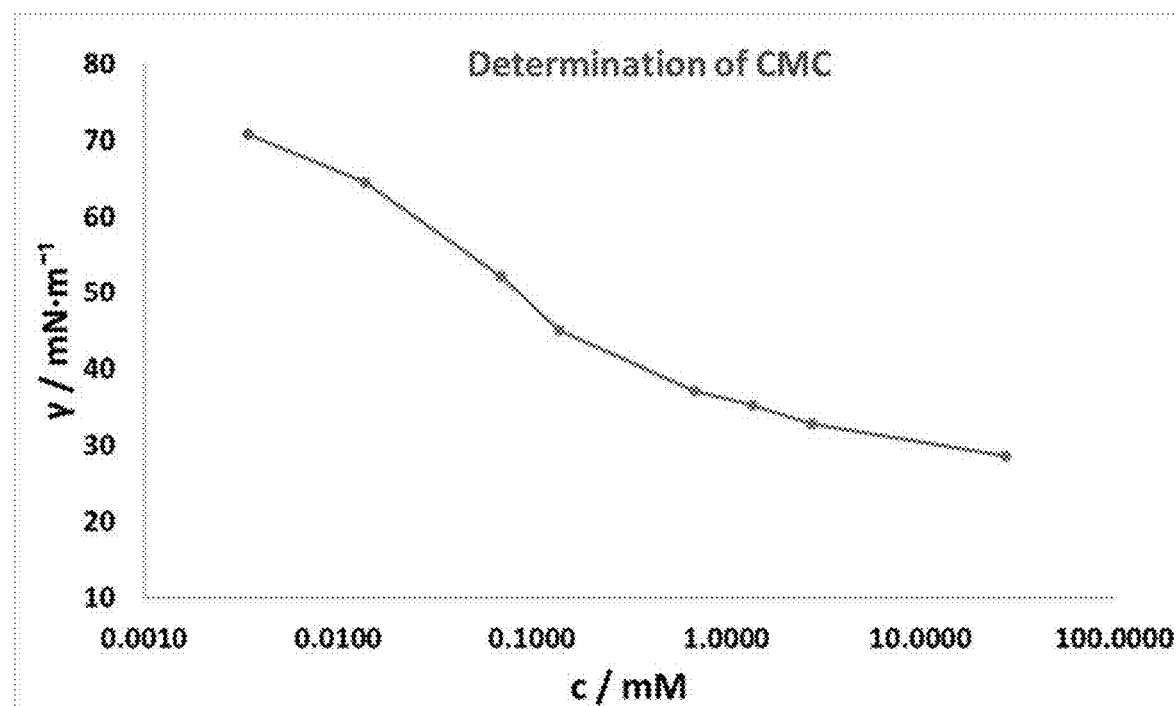
FIG. 3 shows a plot of surface tension versus concentration measured at pH=7 as described in Example 3B, wherein the Y axis depicts the surface tension (γ) in millinewtons per meter (mN/m) and the X axis depicts the concentration (c) in millimoles (mM).

The critical micelle concentration (CMC) of the 6-((2-butyloctyl)oxy)-N,N-dimethyl-6-oxohexan-1-aminium chloride from Example 3a was tested. From the change in surface tension with concentration in water, the CMC was determined to be about 27.47 mmol. The minimum surface tension that can be reached by this surfactant is about 29 mN/m, namely 29 mN/m±3 mN/m. FIG. 3 is a plot of these results, showing surface tension versus concentration. From the plot of the results a CMC value could not be clearly determined at concentrations as high as 27.4 mmol, with the surface tension asymptotically approaching a value of about 29 mN/m.

Example 4a

Synthesis of 4-((6-((2-butyloctyl)oxy)-6-oxohexyl)dimethylammonio)butane-1-sulfonate 2-Butyloctyl 6-(dimethylamino)hexanoate (2.04 mmol, 700 mg) was dissolved in ethyl acetate (30 mL). 1,4-Butane sultone (3.06 mmol, 0.31 mL) was added. The mixture was heated to reflux for 12 hours, followed by evaporation of the solvent. The resultant white waxy solid was washed with acetone to give 4-((6-((2-butyloctyl)oxy)-6-oxohexyl)dimethylammonio)butane-1-sulfonate in 89% yield. $^1$H NMR (500 MHz, DMSO) δ 3.93 (d, J=5.7 Hz, 2H), 3.30-3.28 (m, 4H), 2.97 (s, 3H), 2.49-2.43 (m, 2H), 2.34 (t, J=7.4 Hz, 2H), 1.96-1.76 (m, 9H), 1.27-1.25 (m, 18H), 0.88-0.85 (m, 6H).

Example 4b

Determination of Critical Micelle Concentration (CMC)

Figure 4A:
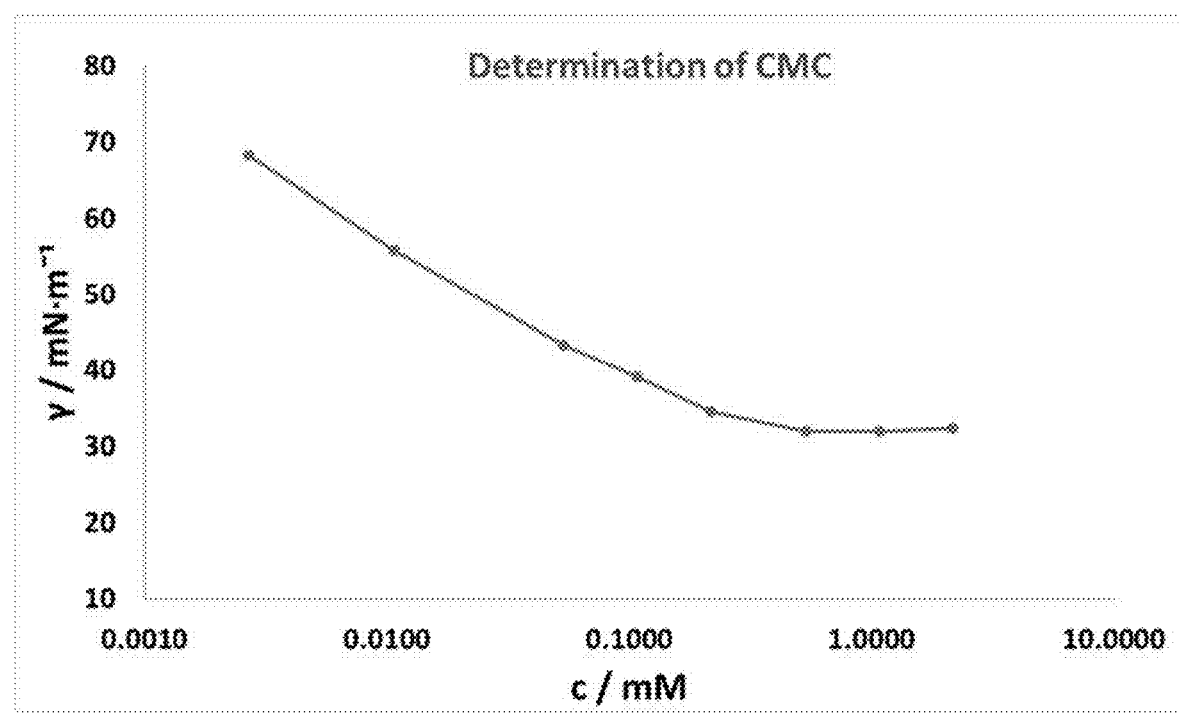
FIG. 4A shows a plot of surface tension versus concentration measured at pH=7 as described in Example 4B, wherein the Y axis depicts the surface tension (γ) in millinewtons per meter (mN/m) and the X axis depicts the concentration (c) in millimoles (mM).

The critical micelle concentration (CMC) of the 4-((6-((2-butyloctyl)oxy)-6-oxohexyl)dimethylammonio)butane-1-sulfonate from Example 4a was tested. From the change in surface tension with concentration in water, the CMC was determined to be about 0.54 mmol. The plateau value of minimum surface tension that can be reached by this surfactant is about 32 mN/m, namely 32 mN/m±3 mN/m. FIG. 4A is a plot of these results, showing surface tension versus concentration. From the plot of the results, the surface tension at the CMC is equal to or less than about 32 mN/m.

Example 4c

Determination of Dynamic Surface Tension

Figure 4B:
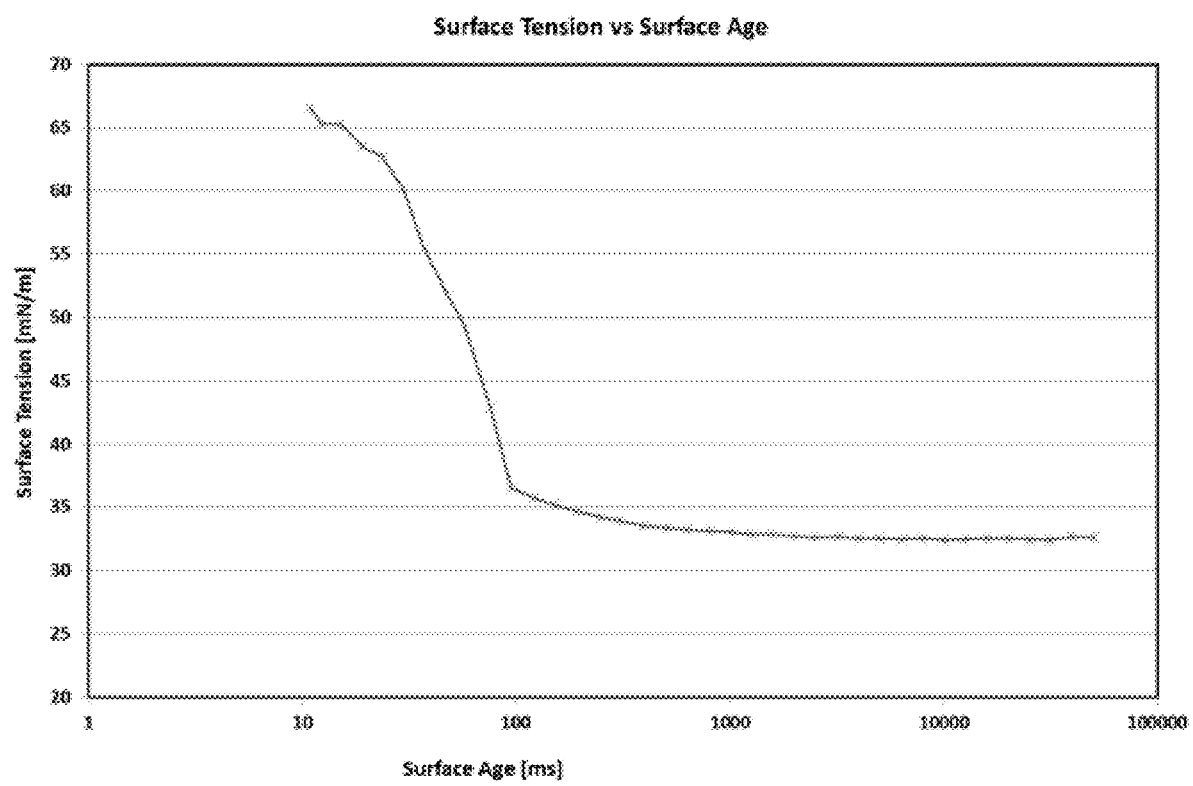
FIG. 4B shows a plot of dynamic surface tension as change in surface tension versus time as described in Example 4C, wherein the Y axis depicts the surface tension in millinewtons per meter (mN/m) and the X axis depicts the surface age in milliseconds (ms).

The dynamic surface tension of the 4-((6-((2-butyloctyl)oxy)-6-oxohexyl)dimethylammonio)butane-1-sulfonate from Example 4a was determined with a bubble pressure tensiometer which measures the change of surface tension of a freshly created air-water interface with time. FIG. 4B presents a plot of the surface tension versus time, showing that surface tension in the time interval between 10 and 100 ms drops rapidly from about 66 mN/m to about 36 mN/m. In the time interval from 100 to 8,000 ms, the surface tension drops slowly from 36 mN/m to about 32 mN/m, approaching asymptotically the saturation value of the surface tension at the CMC.

Example 4d

Determination of Wetting Properties

In addition to surface tension and surface dynamics, the wetting properties of the of the 4-((6-((2-butyloctyl)oxy)-6-oxohexyl)dimethylammonio)butane-1-sulfonate from Example 4a were tested on various surfaces. For example, hydrophobic substrates such as polyethylene-HD exhibit surface wetting with a contact angle of 44.4°. On oleophobic and hydrophobic substrates such as Teflon, the measured contact angle was much less than that of water's contact angle of 119°, at 62.2° (Table 3).

TABLE 3

| Substrate | CA of Surfactant (°) | Concentration | CA of water (°) |
|---|---|---|---|
| Teflon | 62.2 | 10x CMC | 119 |
| Polyethylene-HD | 44.4 | 10x CMC | 93.6 |
| Nylon | 28.7 | 10x CMC | 50 |
| Polyethylene terephthalate | 29.8 | 10x CMC | 65.3 |

Example 5a

Synthesis of 2-butyloctyl 6-(dimethylamino)hexanoate N-oxide

2-Butyloctyl 6-(dimethylamino)hexanoate was treated with hydrogen peroxide in water for 24 hours at 70° C. to give 2-butyloctyl 6-(dimethylamino)hexanoate N-oxide as an oil in 90% yield. $^1$H NMR (500 MHz, DMSO) δ 3.93 (d, J=5.7 Hz, 2H), 3.30-3.28 (m, 4H), 2.97 (s, 3H), 2.49-2.43 (m, 2H), 2.34 (t, J=7.4 Hz, 2H), 1.96-1.76 (m, 9H), 1.27-1.25 (m, 18H), 0.88-0.85 (m, 6H).

Example 5b

Determination of Critical Micelle Concentration (CMC)

Figure 5A:
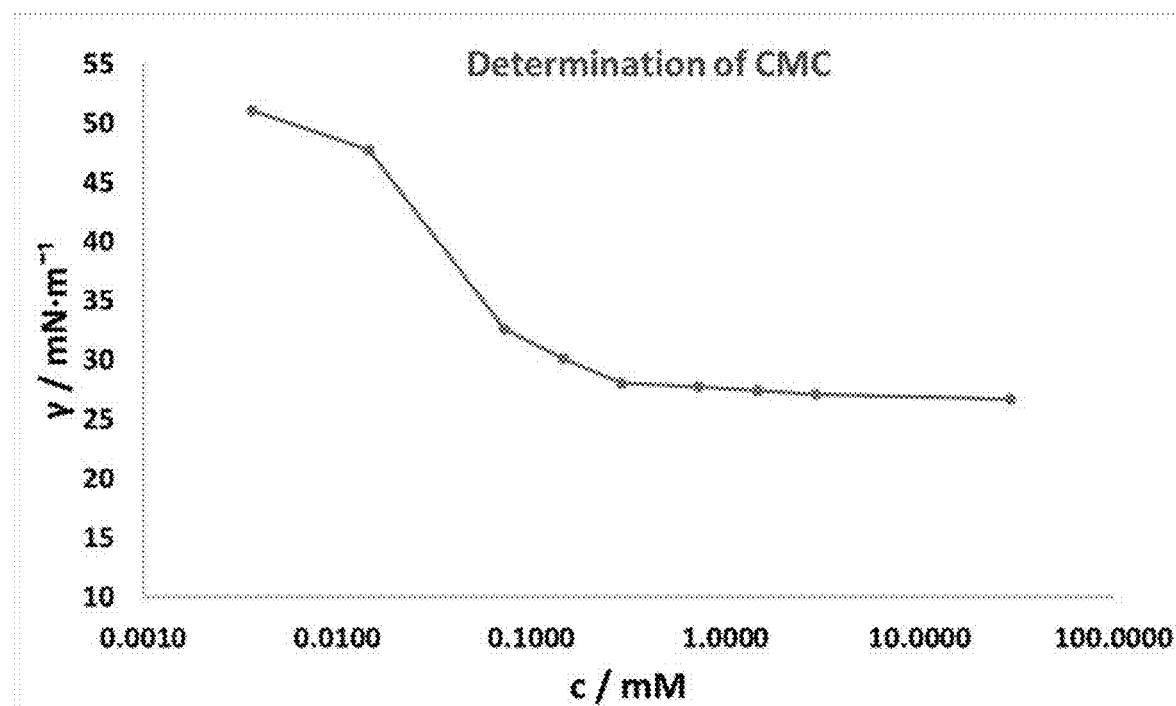
FIG. 5A shows a plot of surface tension versus concentration measured at pH=7 as described in Example 5B, wherein the Y axis depicts the surface tension (γ) in millinewtons per meter (mN/m) and the X axis depicts the concentration (c) in millimoles (mM).

The critical micelle concentration (CMC) of the 2-butyloctyl 6-(dimethylamino)hexanoate N-oxide from Example 5a was tested. From the change in surface tension with concentration in water, the CMC was determined to be about 0.29 mmol. The plateau value of minimum surface tension that can be reached by this surfactant is about 28 mN/m, namely 28 mN/m±3 mN/m. FIG. 5A is a plot of these results, showing surface tension versus concentration. From the plot of the results, the surface tension at the CMC is equal to or less than about 28 mN/m.

Example 5c

Determination of Dynamic Surface Tension

Figure 5B:
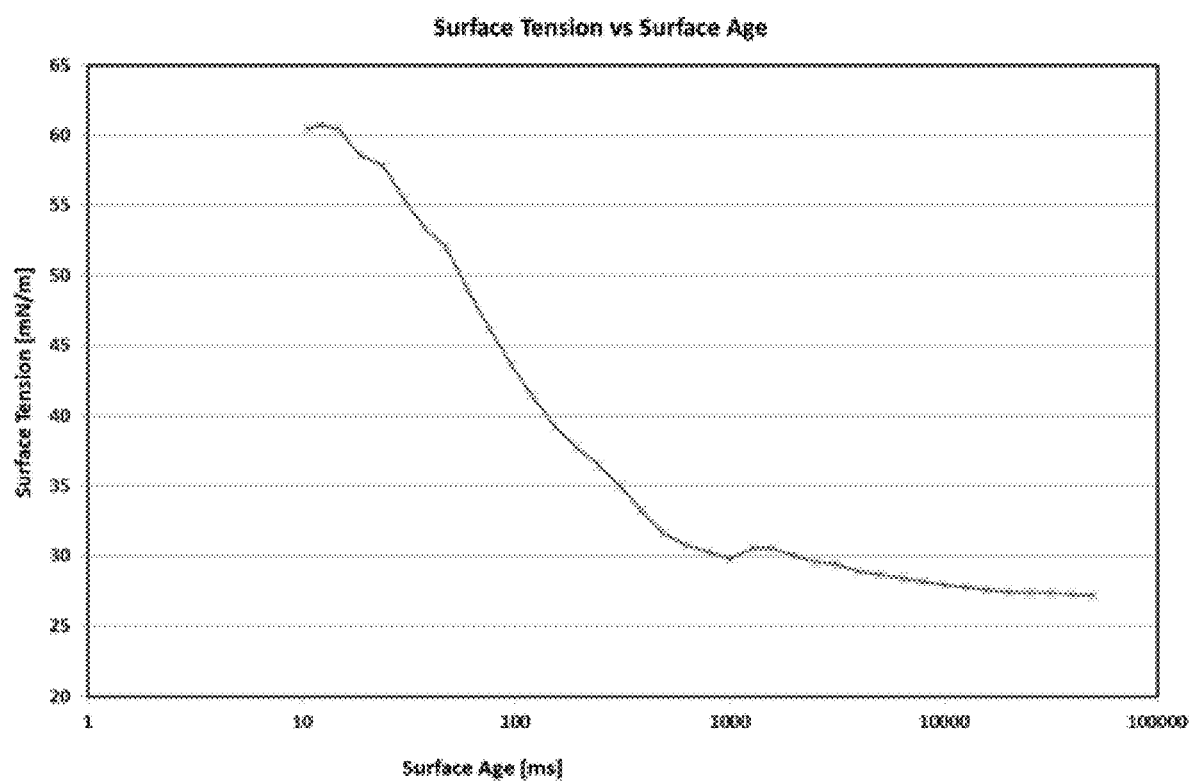
FIG. 5B shows a plot of dynamic surface tension as change in surface tension versus time as described in Example 5C, wherein the Y axis depicts the surface tension in millinewtons per meter (mN/m) and the X axis depicts the surface age in milliseconds (ms).

The dynamic surface tension of the 2-butyloctyl 6-(dimethylamino)hexanoate N-oxide from Example 5a was determined with a bubble pressure tensiometer which measures the change of surface tension of a freshly created air-water interface with time. FIG. 5B presents a plot of the surface tension versus time, showing that surface tension in the time interval between 10 and 1,000 ms drops rapidly from about 60 mN/m to about 30 mN/m. In the time interval from 1,000 to 8,000 ms, the surface tension drops slowly from 30 mN/m to about 28 mN/m, approaching asymptotically the saturation value of the surface tension at the CMC.

Example 5d

Determination of Wetting Properties

In addition to surface tension and surface dynamics, the wetting properties of the of the 2-butyloctyl 6-(dimethylamino)hexanoate N-oxide from Example 5a were tested on various surfaces. For example, hydrophobic substrates such as polyethylene-HD exhibit surface wetting with a contact angle of 31.6°. On oleophobic and hydrophobic substrates such as Teflon, the measured contact angle was much less than that of water's contact angle of 119°, at 41.5° (Table 4).

TABLE 4

| Substrate | CA of Surfactant (°) | Concentration | CA of water (°) |
|---|---|---|---|
| Teflon | 41.0 | 10x CMC | 119 |
| Polyethylene-HD | 31.9 | 10x CMC | 93.6 |
| Nylon | 38.5 | 10x CMC | 50 |
| Polyethylene terephthalate | 9.2 | 10x CMC | 65.3 |

Example 6a

Synthesis of 6-((2-butyloctyl)oxy)-6-oxohexan-1-aminium Chloride

2-Butyloctyl 6-(dimethylamino)hexanoate was treated with 1 equivalent of hydrochloric acid to provide 6-((2-butyloctyl)oxy)-6-oxohexan-1-aminium chloride.

Example 6b

Determination of Critical Micelle Concentration (CMC)

Figure 6A:
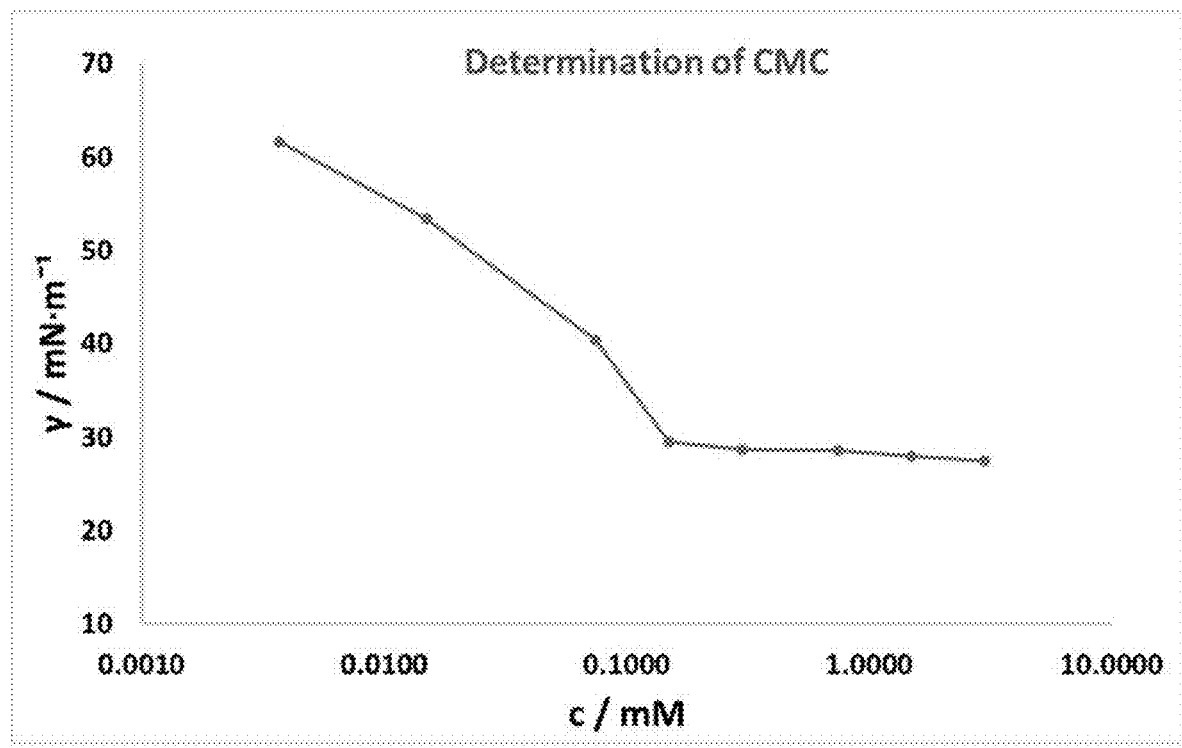
FIG. 6A shows a plot of surface tension versus concentration measured at pH=7 as described in Example 6B, wherein the Y axis depicts the surface tension (γ) in millinewtons per meter (mN/m) and the X axis depicts the concentration (c) in millimoles (mM).

The critical micelle concentration (CMC) of the 6-((2-butyloctyl)oxy)-6-oxohexan-1-aminium chloride from Example 6a was tested. From the change in surface tension with concentration in water, the CMC was determined to be about 0.15 mmol. The plateau value of minimum surface tension that can be reached by this surfactant is about 27 mN/m, namely 27 mN/m±3 mN/m. FIG. 6A is a plot of these results, showing surface tension versus concentration. From the plot of the results, the surface tension at the CMC is equal to or less than about 30 mN/m.

Example 6c

Determination of Dynamic Surface Tension

Figure 6B:
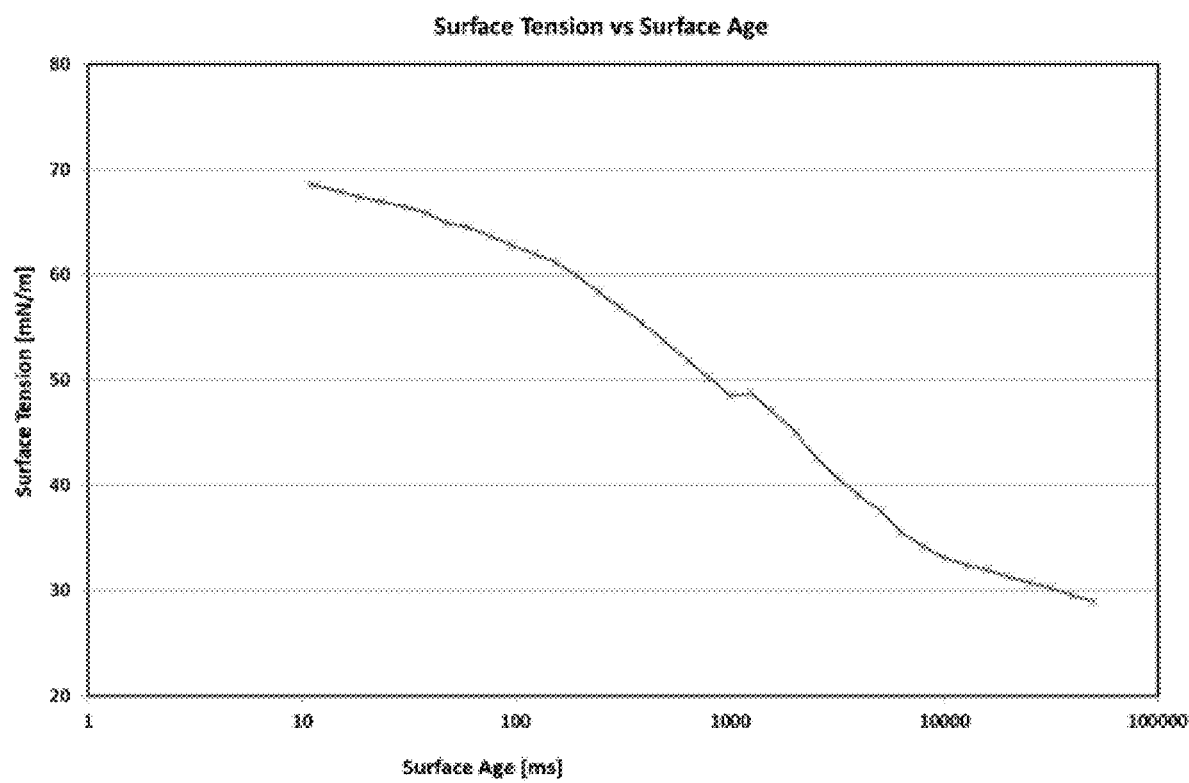
FIG. 6B shows a plot of dynamic surface tension as change in surface tension versus time as described in Example 6C, wherein the Y axis depicts the surface tension in millinewtons per meter (mN/m) and the X axis depicts the surface age in milliseconds (ms).

The dynamic surface tension of the 6-((2-butyloctyl)oxy)-6-oxohexan-1-aminium chloride from Example 6a was determined with a bubble pressure tensiometer which measures the change of surface tension of a freshly created air-water interface with time. FIG. 6B presents a plot of the surface tension versus time, showing that surface tension in the time interval between 10 and 8,000 ms drops slowly from about 69 mN/m to about 29 mN/m, with a slight plateau of about 49 mN/m at a surface age of 1,000 ms, approaching the saturation value of the surface tension at the CMC.

Example 6d

Determination of Wetting Properties

In addition to surface tension and surface dynamics, the wetting properties of the of the 6-((2-butyloctyl)oxy)-6-oxohexan-1-aminium chloride from Example 6a were tested on various surfaces. For example, hydrophobic substrates such as polyethylene-HD exhibit surface wetting with a contact angle of 25.8°. On oleophobic and hydrophobic substrates such as Teflon, the measured contact angle was much less than that of water's contact angle of 119°, at 48.7° (Table 5).

TABLE 5

| Substrate | CA of Surfactant (°) | Concentration | CA of water (°) |
|---|---|---|---|
| Teflon | 48.7 | 10x CMC | 119 |
| Polyethylene-HD | 25.8 | 10x CMC | 93.6 |
| Nylon | 24.5 | 10x CMC | 50 |
| Polyethylene terephthalate | 20.1 | 10x CMC | 65.3 |

Example 7a

Synthesis of 6-((2-butyloctyl)oxy)-6-oxohexan-1-aminium 4-methylbenzenesulfonate 6-Aminohexanoic acid (38.11 mmol, 5 g) was dissolved in benzene (50 mL) in a 100 mL round bottom flask equipped with a Dean Stark trap. p-Toluenesulfonic acid monohydrate (38.11 mmol, 7.25 g) and 2-butyloctanol (38.11 mmol, 7.1 g, 8.5 mL) were added, and the mixture was heated to reflux for one week, until no further water was separated in the Dean Stark trap. The solvent was removed under vacuum and the product was crystallized from acetone at −20° C. to remove residual unreacted alcohol. The resultant white waxy solid was filtered to give 2-butyloctyl)oxy)-6-oxohexan-1-aminium 4-methylbenzenesulfonate in 82% yield. $^1$H NMR (500 MHz, DMSO) δ 7.49 (d, J=8.0 Hz, 2H), 7.12 (dd, J=8.4, 0.6 Hz, 2H), 3.93 (d, J=5.7 Hz, 2H), 2.79-2.73 (m, 2H), 2.31-2.28 (m, 5H), 1.55-1.50 (m, 5H), 1.31-1.25 (m, 18H), 0.88-0.85 (m, 6H).

Example 7b

Determination of Critical Micelle Concentration (CMC)

Figure 7A:
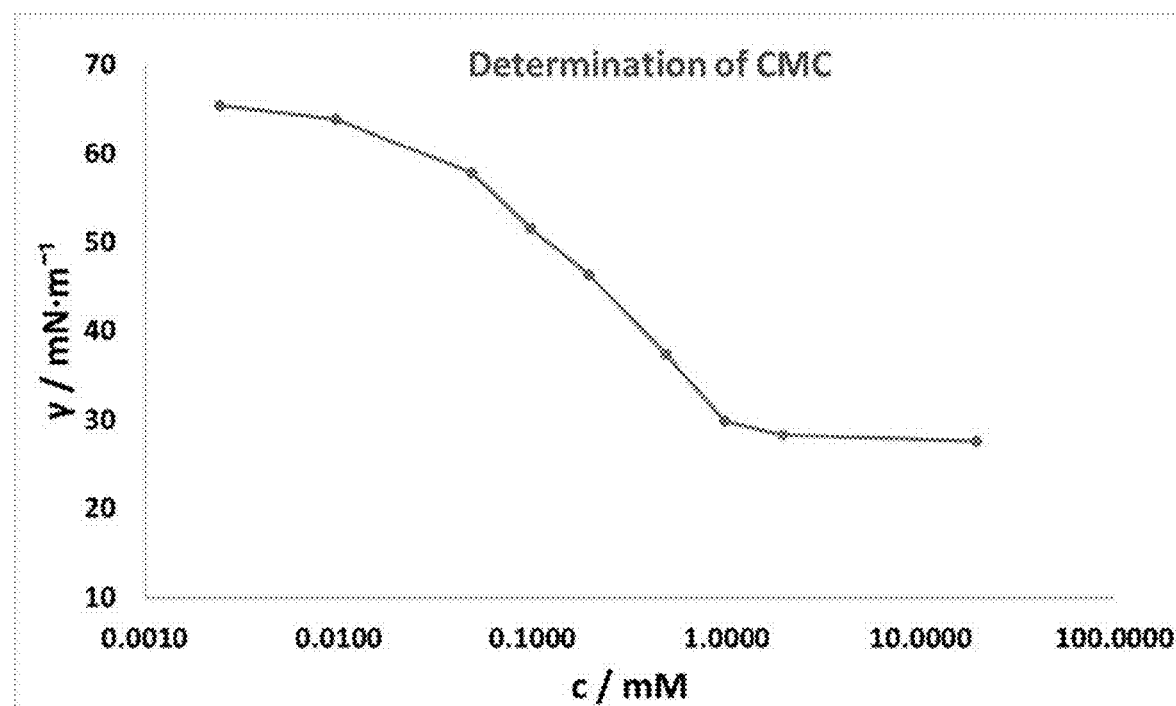
FIG. 7A shows a plot of surface tension versus concentration measured at pH=7 as described in Example 7B, wherein the Y axis depicts the surface tension (γ) in millinewtons per meter (mN/m) and the X axis depicts the concentration (c) in millimoles (mM).

The critical micelle concentration (CMC) of the 6-((2-butyloctyl)oxy)-6-oxohexan-1-aminium 4-methylbenzenesulfonate from Example 7a was tested. From the change in surface tension with concentration in water, the CMC was determined to be about 2.12 mmol. The plateau value of minimum surface tension that can be reached by this surfactant is about 27 mN/m, namely 27 mN/m±3 mN/m. FIG. 7A is a plot of these results, showing surface tension versus. From the plot of the results, the surface tension at the CMC is equal to or less than about 30 mN/m, and the surface tension equal to or less than about 28.5 mN/m at a concentration of about 1.0 mmol or greater.

Example 7c

Determination of Dynamic Surface Tension

Figure 7B:
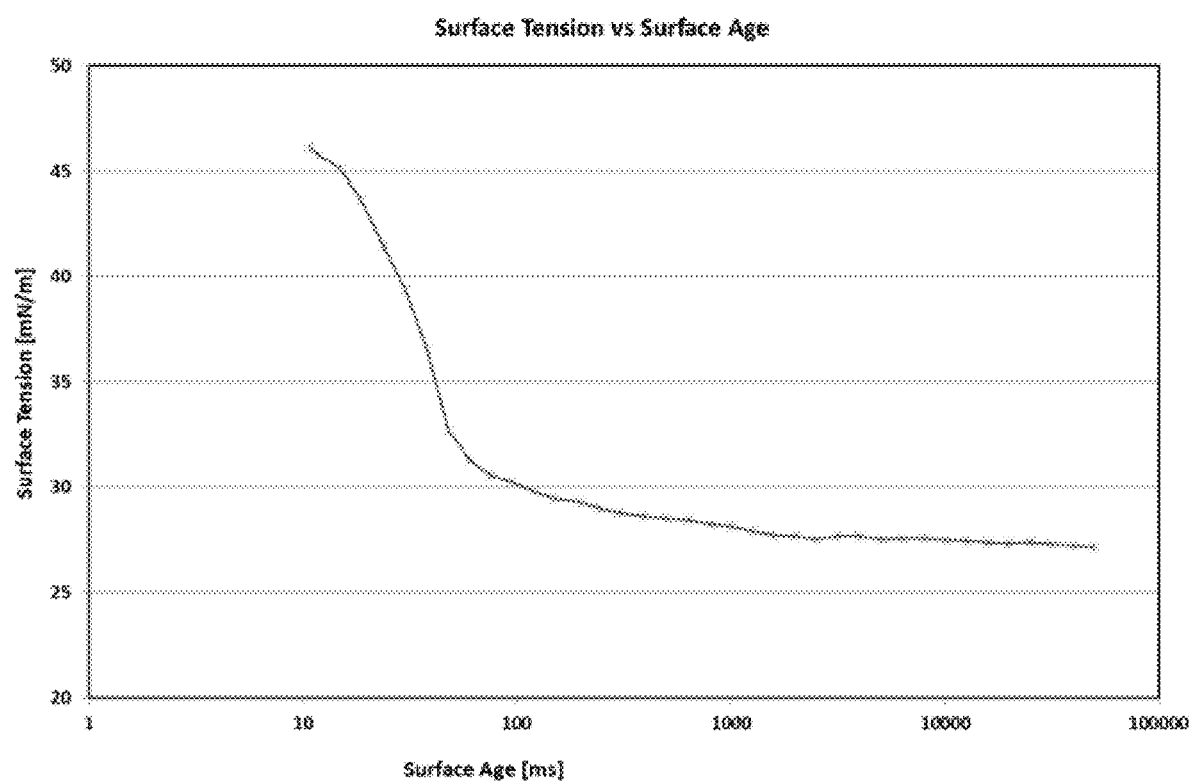
FIG. 7B shows a plot of dynamic surface tension as change in surface tension versus time as described in Example 7C, wherein the Y axis depicts the surface tension in millinewtons per meter (mN/m) and the X axis depicts the surface age in milliseconds (ms).

The dynamic surface tension of the 6-((2-butyloctyl)oxy)-6-oxohexan-1-aminium 4-methylbenzenesulfonate from Example 7a was determined with a bubble pressure tensiometer which measures the change of surface tension of a freshly created air-water interface with time. FIG. 7B presents a plot of the surface tension versus time, showing that surface tension in the time interval between 10 and 100 ms drops rapidly from about 46 mN/m to about 30 mN/m. In the time interval from 100 to 8,000 ms, the surface tension drops slowly from 30 mN/m to about 27 mN/m, approaching asymptotically the saturation value of the surface tension at the CMC.

Example 7d

Determination of Wetting Properties

In addition to surface tension and surface dynamics, the wetting properties of the 6-((2-butyloctyl)oxy)-6-oxohexan-1-aminium 4-methylbenzenesulfonate from Example 7a were tested on various surfaces. For example, hydrophobic substrates such as polyethylene-HD exhibit surface wetting with a contact angle of 14.6°. On oleophobic and hydrophobic substrates such as Teflon, the measured contact angle was much less than that of water's contact angle of 119°, at 49.4° (Table 6).

TABLE 6

| Substrate | CA of Surfactant (°) | Concentration | CA of water (°) |
|---|---|---|---|
| Teflon | 49.4 | 10x CMC | 119 |
| Polyethylene-HD | 14.6 | 10x CMC | 93.6 |
| Nylon | 12.6 | 10x CMC | 50 |
| Polyethylene terephthalate | 13.2 | 10x CMC | 65.3 |

Example 8

Formulation for Ink Fixer Fluid

In this Example, a formulation for ink fixer fluid is provided, including a surfactant, which may be one or more of Surfactants 1-7 described herein. The components of the formulation are shown below in Table 7.

TABLE 7

| Component | Function | Weight % |
|---|---|---|
| Surfactant | Reduce Surface Tension | 0-1.5 |
| Humectant | Wetting Agent | 1-20 |
| Metal Carboxylate | Fixer Agent | 3-16 |
| Acid | pH Adjuster | As needed |
| Water | | 36-96 |

Example 9

Formulation for Paint

In this Example, a formulation for use as paint is provided, including a surfactant, which may be one or more of Surfactants 1-7 described herein. The formulation is shown below in Table 8.

TABLE 8

| Component | Function | Weight % |
|---|---|---|
| Polymer | Latex | 40-70 |
| Surfactant | Emulsifier | 0.5-5 |
| Pigment | | As Desired |
| Water | Solvent | 25-59.5 |

Example 10

Formulation for Adhesive

In this Example, a formulation for use as an adhesive is provided, including a surfactant, which may be one or more of Surfactants 1-7 described herein. The formulation is shown below in Table 9.

TABLE 9

| Component | Function | Weight % |
|---|---|---|
| Phenol Formaldehyde Resin | Adhesive | 40-80 |
| Calcium Carbonate, Starch, Wheat Meal | Filling Agent | 5-30 |
| Surfactant | Foaming Agent | 0.1-10 |
| Water | | 0-40 |

Example 11

Formulation for Paint Stripper

In this Example, a formulation for use as a paint stripper is provided, including a surfactant, which may be one or more of Surfactants 1-7 described herein. The formulation is shown below in Table 10.

TABLE 10

| Component | Function | Weight % |
|---|---|---|
| 1,2-Dichloroethylene | Stripping Agent | 55-65 |
| Benzyl Alcohol | Aromatic Co-Solvent | 10-20 |
| Ethanol | Aliphatic Co-Solvent | 1-10 |
| Naphtha | Organic Solvent | 1-10 |
| Parrafin Wax | Wax | 1-5 |
| Thickener | Viscosity Modifier | 0-5 |
| Surfactant | Solubility Modifier | 1-10 |
| Corrosion Inhibitor | | 0-10 |
| Water | | 1-20 |

Aspects

Aspect 1 is a formulation for an ink fixer fluid, comprising: at least one surfactant of the following formula:

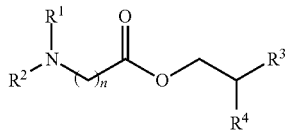

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; and one or more solvents; a fixer agent; and water.

Aspect 2 is the formulation of Aspect 1, wherein the fixer agent is a metal carboxylate.

Aspect 3 is the formulation of either Aspect 1 or Aspect 2, further comprising a humectant.

Aspect 4 is the formulation of any of Aspects 1-3, further comprising an acid.

Aspect 5 is the formulation of any of Aspects 1-4, further comprising an aqueous vehicle.

Aspect 6 is the formulation of any of Aspects 1-5, further comprising a colorant dispersed in an aqueous vehicle.

Aspect 7 is the formulation according to any of Aspects 1-6, wherein the surfactant is 6-((2-butyloctyl)oxy)-N,N,N-trimethyl-6-oxohexan-1-aminium iodide, having the following formula:

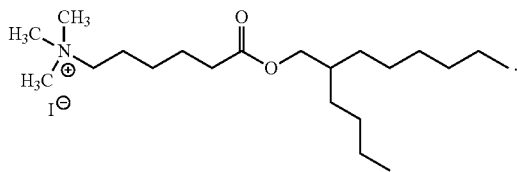 [SMILES: CCCCCCC(CCCC)COC(=O)CCCCC[N+](C)(C)C ; [I-]]

Aspect 8 is the formulation according to any of Aspects 1-6, wherein the surfactant is 6-((2-butyloctyl)oxy)-N,N-dimethyl-6-oxohexan-1-aminium 4-methylbenzenesulfonate, having the following formula:

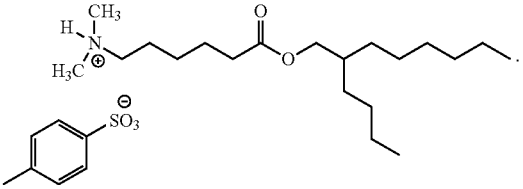

Aspect 9 is the formulation according to any of Aspects 1-6, wherein the surfactant is 6-(dodecyloxy)-N,N-dimethyl-6-oxohexan-1-aminium chloride, having the following formula:

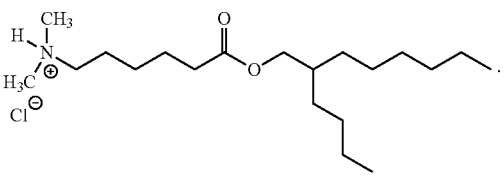 [SMILES: [Cl-] ; CCCCCCC(CCCC)COC(=O)CCCCC[NH+](C)C]

Aspect 10 is the formulation according to any of Aspects 1-6, wherein the surfactant is 4-((6-((2-butyloctyl)oxy)-6-oxohexyl)dimethylammonio)butane-1-sulfonate, having the following formula:

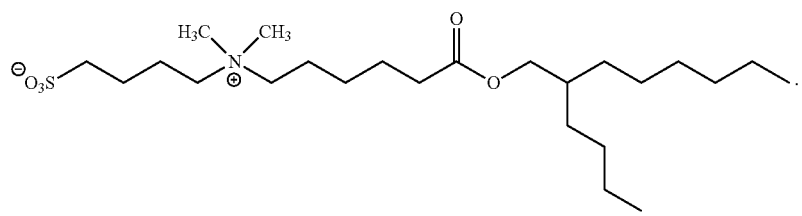

Aspect 11 is the formulation according to any of Aspects 1-6, wherein the surfactant is 2-butyloctyl 6-(dimethylamino)hexanoate N-oxide, having the following formula:

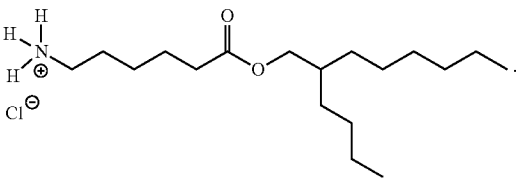 [SMILES: CCCCCCC(CCCC)COC(=O)CCCCC[NH3+] ; [Cl-]]

Aspect 12 is the formulation according to any of Aspects 1-6, wherein the surfactant is 6-((2-butyloctyl)oxy)-6-oxohexan-1-aminium chloride, having the following formula:

Aspect 13 is the formulation according to any of Aspects 1-6, wherein the surfactant is 6-((2-butyloctyl)oxy)-6-oxohexan-1-aminium 4-methylbenzenesulfonate, having the following formula:

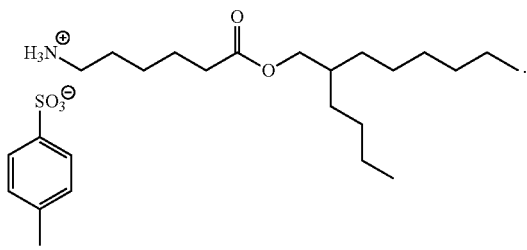

Aspect 14 is a formulation for a paint, comprising: at least at least one surfactant of the following formula:

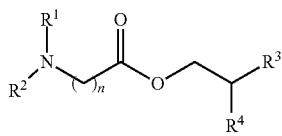

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; a latex; and water.

Aspect 15 is the formulation of Aspect 14, further comprising one or more driers.

Aspect 16 is the formulation of either Aspect 14 or Aspect 15, further comprising one or more solvents.

Aspect 17 is the formulation of any of Aspects 14-16, further comprising at one or more pigments.

Aspect 18 is the formulation according to any of Aspects 14-17, wherein the surfactant is 6-((2-butyloctyl)oxy)-N,N,N-trimethyl-6-oxohexan-1-aminium iodide, having the following formula:

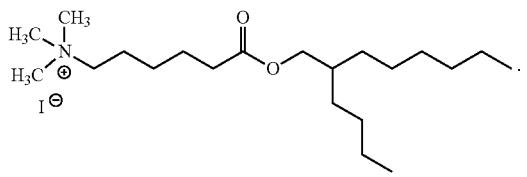 [SMILES: CCCCCCC(CCCC)COC(=O)CCCCC[N+](C)(C)C ; [I-]]

Aspect 19 is the formulation according to any of Aspects 14-17, wherein the surfactant is 6-((2-butyloctyl)oxy)-N,N-dimethyl-6-oxohexan-1-aminium 4-methylbenzenesulfonate, having the following formula:

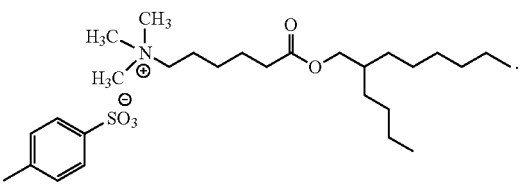

Aspect 20 is the formulation according to any of Aspects 14-17, wherein the surfactant is 6-(dodecyloxy)-N,N-dimethyl-6-oxohexan-1-aminium chloride, having the following formula:

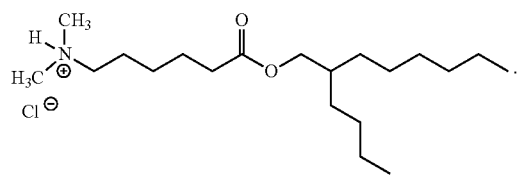 [SMILES: [Cl-] ; CCCCCCC(CCCC)COC(=O)CCCCC[NH+](C)C]

Aspect 21 is the formulation according to any of Aspects 14-17, wherein the surfactant is 4-((6-((2-butyloctyl)oxy)-6-oxohexyl)dimethylammonio)butane-1-sulfonate, having the following formula:

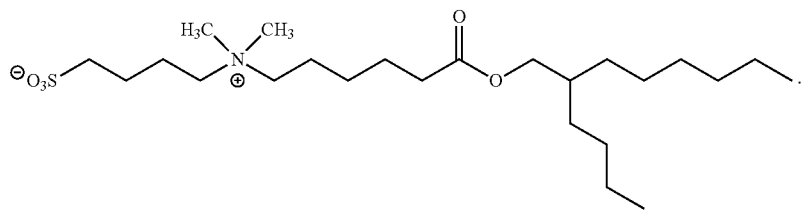

Aspect 22 is the formulation according to any of Aspects 14-17, wherein the surfactant is 2-butyloctyl 6-(dimethylamino)hexanoate N-oxide, having the following formula:

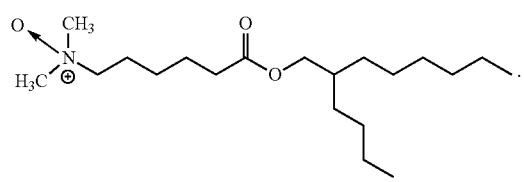 [SMILES: O ; CCCCCCC(CCCC)COC(=O)CCCCC[NH+](C)C]

Aspect 23 is the formulation according to any of Aspects 14-17, wherein the surfactant is 6-((2-butyloctyl)oxy)-6-oxohexan-1-aminium chloride, having the following formula:

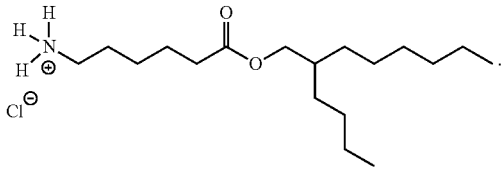 [SMILES: [Cl-] ; CCCCCCC(CCCC)COC(=O)CCCCC[NH3+]]

Aspect 24 is the formulation according to any of Aspects 14-17, wherein the surfactant is 6-((2-butyloctyl)oxy)-6-oxohexan-1-aminium 4-methylbenzenesulfonate, having the following formula:

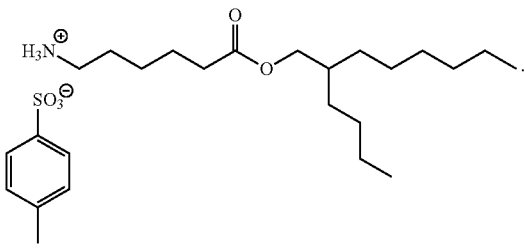

Aspect 25 is a formulation for a paint, comprising: at least one surfactant of the following formula:

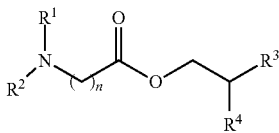

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; a binder; and water.

Aspect 26 is the formulation of Aspect 25, further comprising one or more driers.

Aspect 27 is the formulation of either Aspect 25 or Aspect 26, further comprising one or more solvents.

Aspect 28 is the formulation of any of Aspects 25-27, further comprising at one or more pigments.

Aspect 29 is the formulation according to any of Aspects 25-28, wherein the surfactant is 6-((2-butyloctyl)oxy)-N,N,N-trimethyl-6-oxohexan-1-aminium iodide, having the following formula:

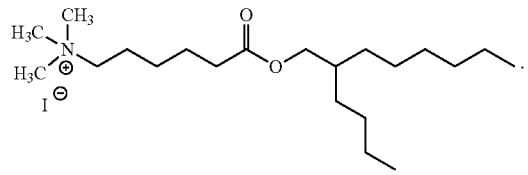 [SMILES: CCCCCCC(CCCC)COC(=O)CCCCC[N+](C)(C)C ; [I-]]

Aspect 30 is the formulation according to any of Aspects 25-28, wherein the surfactant is 6-((2-butyloctyl)oxy)-N,N-dimethyl-6-oxohexan-1-aminium 4-methylbenzenesulfonate, having the following formula:

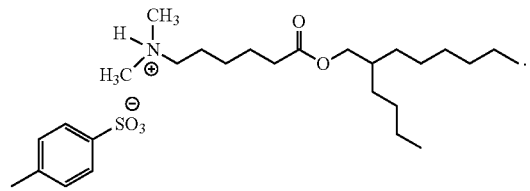

Aspect 31 is the formulation according to any of Aspects 25-28 wherein the surfactant is 6-(dodecyloxy)-N,N-dimethyl-6-oxohexan-1-aminium chloride, having the following formula:

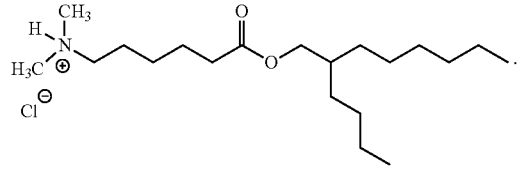 [SMILES: [Cl-] ; CCCCCCC(CCCC)COC(=O)CCCCC[NH+](C)C]

Aspect 32 is the formulation according to any of Aspects 25-28, wherein the surfactant is 4-((6-((2-butyloctyl)oxy)-6-oxohexyl)dimethylammonio)butane-1-sulfonate, having the following formula:

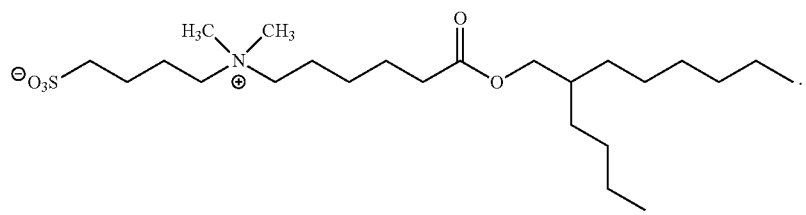

Aspect 33 is the formulation according to any of Aspects 25-28, wherein the surfactant is 2-butyloctyl 6-(dimethylamino)hexanoate N-oxide, having the following formula:

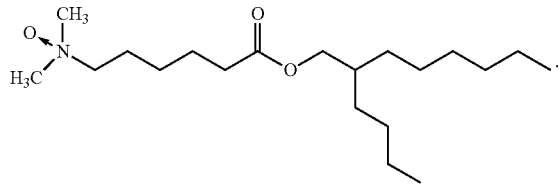 [SMILES: CCCCCCC(CCCC)COC(=O)CCCCC[N+](C)(C)[O-]]

Aspect 34 is the formulation according to any of Aspects 25-28, wherein the surfactant is 6-((2-butyloctyl)oxy)-6-oxohexan-1-aminium chloride, having the following formula:

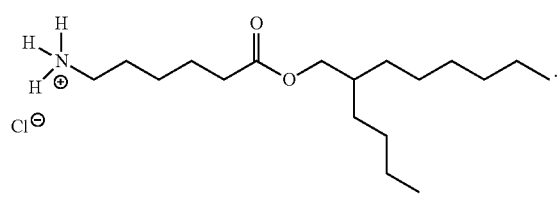 [SMILES: [Cl-] ; CCCCCCC(CCCC)COC(=O)CCCCC[NH3+]]

Aspect 35 is the formulation according to any of Aspects 25-28, wherein the surfactant is 6-((2-butyloctyl)oxy)-6-oxohexan-1-aminium 4-methylbenzenesulfonate, having the following formula:

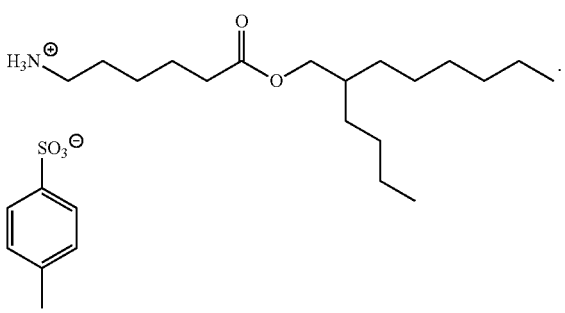

Aspect 36 is a formulation for an adhesive, comprising: at least one surfactant of the following formula:

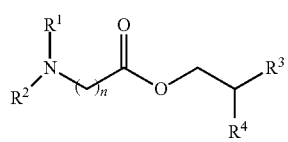

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; an adhesive; and water.

Aspect 37 is the formulation of Aspect 36, further comprising a filling agent.

Aspect 38 is the formulation according to either Aspect 36 or Aspect 37, wherein the surfactant is 6-((2-butyloctyl)oxy)-N,N,N-trimethyl-6-oxohexan-1-aminium iodide, having the following formula:

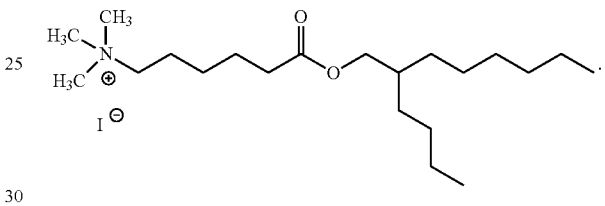

Aspect 39 is the formulation according to either Aspect 36 or Aspect 37, wherein the surfactant is 6-((2-butyloctyl)oxy)-N,N-dimethyl-6-oxohexan-1-aminium 4-methylbenzenesulfonate, having the following formula:

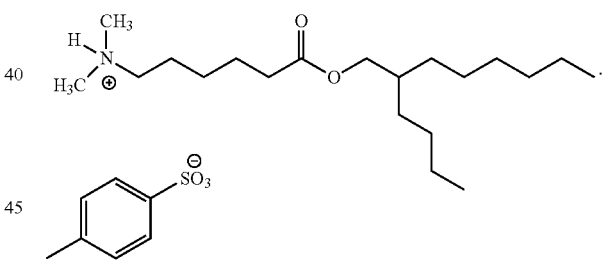

Aspect 40 is the formulation according to either Aspect 36 or Aspect 37 wherein the surfactant is 6-(dodecyloxy)-N,N-dimethyl-6-oxohexan-1-aminium chloride, having the following formula:

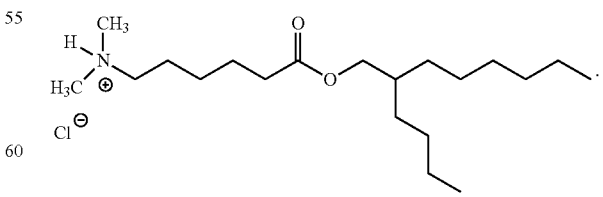

Aspect 41 is the formulation according to either Aspect 36 or Aspect 37, wherein the surfactant is 4-((6-((2-butyloctyl)oxy)-6-oxohexyl)dimethylammonio)butane-1-sulfonate, having the following formula:

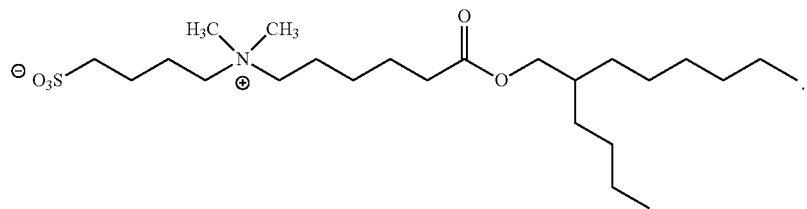

Aspect 42 is the formulation according to either Aspect 36 or Aspect 37, wherein the surfactant is 2-butyloctyl 6-(dimethylamino)hexanoate N-oxide, having the following formula:

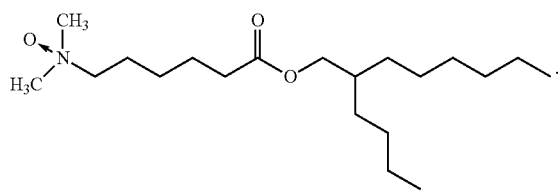 [SMILES: CCCCCCC(CCCC)COC(=O)CCCCC[N+](C)(C)[O-]]

Aspect 43 is the formulation according to either Aspect 36 or Aspect 37, wherein the surfactant is 6-((2-butyloctyl)oxy)-6-oxohexan-1-aminium chloride, having the following formula:

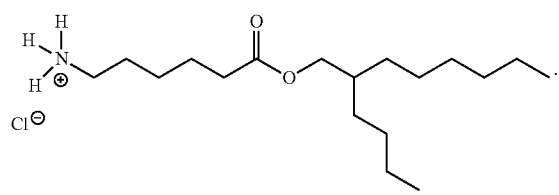 [SMILES: [Cl-] ; CCCCCCC(CCCC)COC(=O)CCCCC[NH3+]]

Aspect 44 is the formulation according to either Aspect 36 or Aspect 37, wherein the surfactant is 6-((2-butyloctyl)oxy)-6-oxohexan-1-aminium 4-methylbenzenesulfonate, having the following formula:

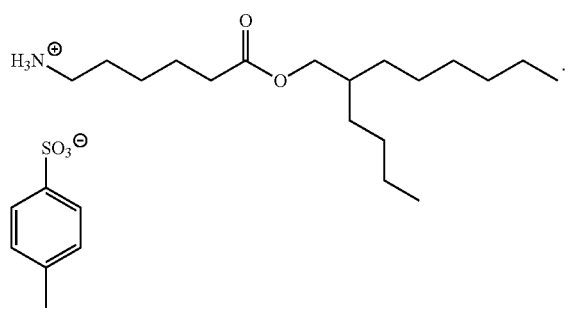

Aspect 45 is a formulation for a paint stripper, comprising: at least one surfactant of the following formula:

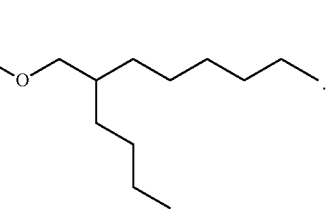

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; 1,2-dichloroethylene; and water.

Aspect 46 is the formulation of Aspect 45, further comprising a wax.

Aspect 47 is the formulation of either Aspect 45 or Aspect 46, further comprising a corrosion inhibitor.

Aspect 48 is the formulation of any of Aspects 45-47, further comprising an organic solvent.

Aspect 49 is the formulation of any of Aspects 45-48, further comprising a thickener.

Aspect 50 is the formulation according to any of Aspects 45-49, wherein the surfactant is 6-((2-butyloctyl)oxy)-N,N,N-trimethyl-6-oxohexan-1-aminium iodide, having the following formula:

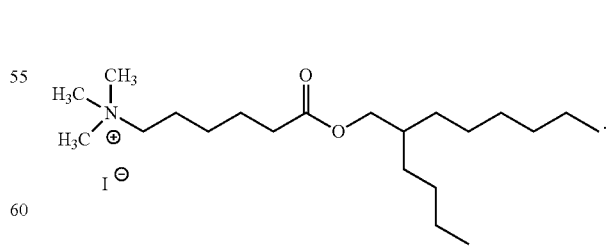

Aspect 51 is the formulation according to any of Aspects 45-49 wherein the surfactant is 6-((2-butyloctyl)oxy)-N,N-dimethyl-6-oxohexan-1-aminium 4-methylbenzenesulfonate, having the following formula:

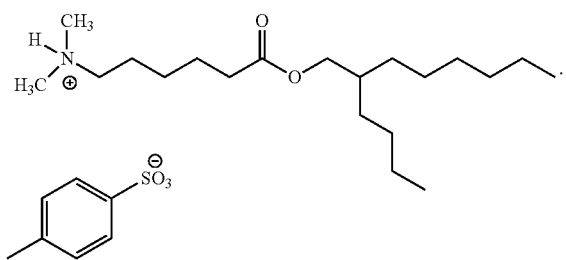

Aspect 52 is the formulation according to any of Aspects 45-49 wherein the surfactant is 6-(dodecyloxy)-N,N-dimethyl-6-oxohexan-1-aminium chloride, having the following formula:

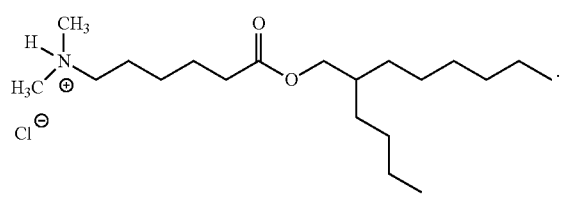 [SMILES: [Cl-] ; CCCCCCC(CCCC)COC(=O)CCCCC[NH+](C)C]

Aspect 53 is the formulation according to according to any of Aspects 45-49, wherein the surfactant is 4-((6)(2-butyloctyl)oxy)-6-oxohexyl)dimethylammonio)butane-1-sulfonate, having the following formula:

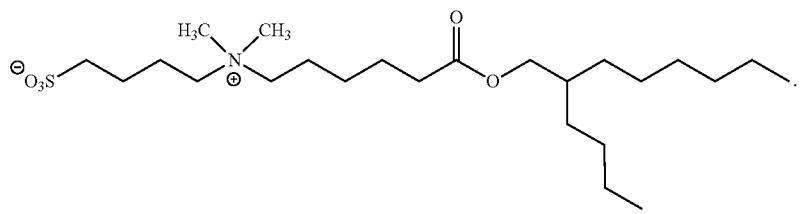

Aspect 54 is the formulation according to according to any of Aspects 45-49, wherein the surfactant is 2-butyloctyl 6-(dimethylamino)hexanoate N-oxide, having the following formula:

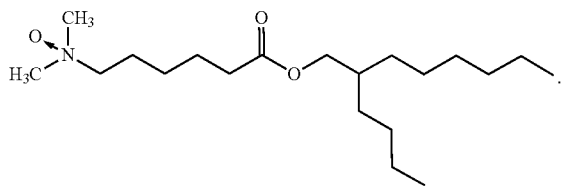 [SMILES: CCCCCCC(CCCC)COC(=O)CCCCC[N+](C)(C)[O-]]

Aspect 55 is the formulation according to according to any of Aspects 45-49, wherein the surfactant is 6-((2-butyloctyl)oxy)-6-oxohexan-1-aminium chloride, having the following formula:

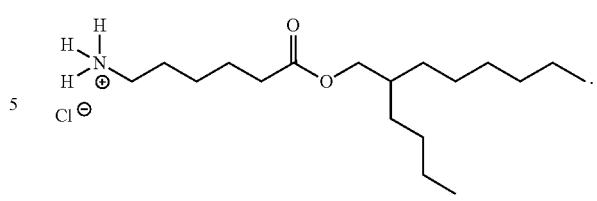

Aspect 56 is the formulation according to according to any of Aspects 45-49, wherein the surfactant is 6-((2-butyloctyl)oxy)-6-oxohexan-1-aminium 4-methylbenzenesulfonate, having the following formula:

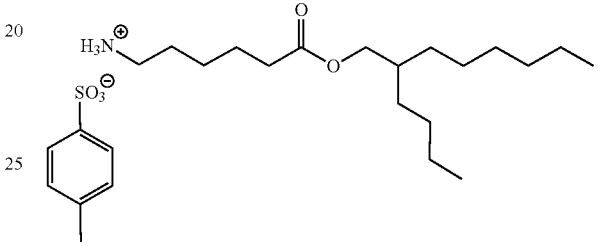

Aspect 57 is a formulation for a paint stripper, comprising: at least one surfactant of the following formula:

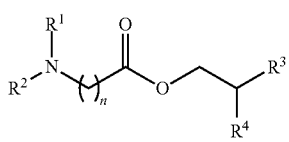

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates; n is an integer from 2 to 5 (including 2 and 5); $R^3$ is $C_5$-$C_{12}$ alkyl; $R^4$ is $C_3$-$C_{10}$ alkyl; the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates; an optional counterion may be associated with the compound and, if present, the counterion may be selected from the group consisting of chloride, bromide, iodide, and 4-methylbenzenesulfonate; 1,2-dichloroethylene; one or more co-solvents; and water.

Aspect 58 is the formulation of Aspect 57, wherein the one or more co-solvents are selected from aromatic alcohols, aromatic ethers, and aliphatic alcohols.

Aspect 59 is the formulation of either Aspect 57 or Aspect 58, further comprising a wax.

Aspect 60 is the formulation of any of Aspects 57-59, further comprising a corrosion inhibitor.

Aspect 61 is the formulation of any of Aspects 57-60, further comprising an organic solvent.

Aspect 62 is the formulation of any of Aspects 57-61, further comprising a thickener.

Aspect 63 is the formulation according to any of Aspects 57-62, wherein the surfactant is 6-((2-butyloctyl)oxy)-N,N,N-trimethyl-6-oxohexan-1-aminium iodide, having the following formula:

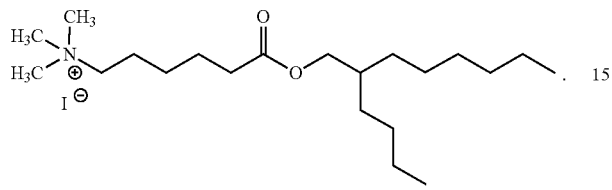

Aspect 64 is the formulation according to any of Aspects 57-62, wherein the surfactant is 6-((2-butyloctyl)oxy)-N,N-dimethyl-6-oxohexan-1-aminium 4-methylbenzenesulfonate, having the following formula:

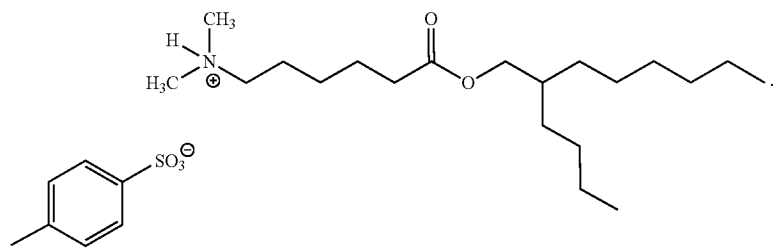

Aspect 65 is the formulation according to any of Aspects 57-62, wherein the surfactant is 6-(dodecyloxy)-N,N-dimethyl-6-oxohexan-1-aminium chloride, having the following formula:

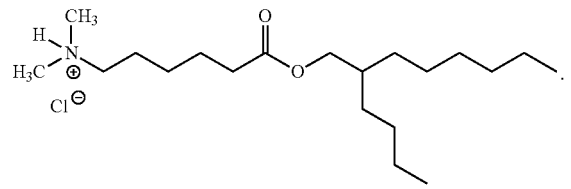 [SMILES: CCCCCCC(CCCC)COC(=O)CCCCC[NH+](C)C ; [Cl-]]

Aspect 66 is the formulation according to any of Aspects 57-62, wherein the surfactant is 4-((6-((2-butyloctyl)oxy)-6-oxohexyl)dimethylammonio)butane-1-sulfonate, having the following formula:

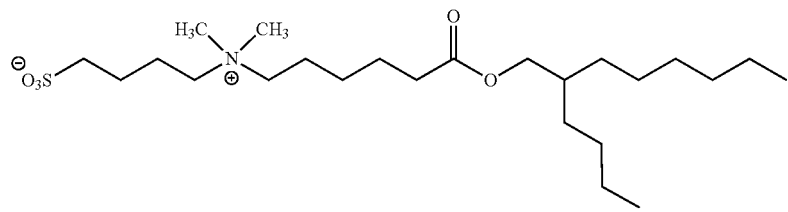

Aspect 67 is the formulation according to any of Aspects 57-62, wherein the surfactant is 2-butyloctyl 6-(dimethylamino)hexanoate N-oxide, having the following formula:

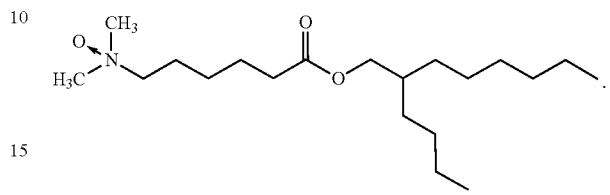

Aspect 68 is the formulation according to any of Aspects 57-62, wherein the surfactant is 6-((2-butyloctyl)oxy)-6-oxohexan-1-aminium chloride, having the following formula:

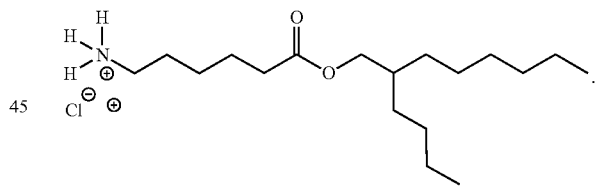

Aspect 69 is the formulation according to any of Aspects 57-62, wherein the surfactant is 6-((2-butyloctyl)oxy)-6-oxohexan-1-aminium 4-methylbenzenesulfonate, having the following formula:

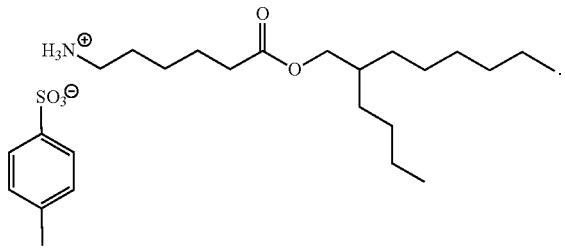

The invention claimed is:

1. A formulation for an ink fixer fluid, comprising:

at least one surfactant of the following formula:

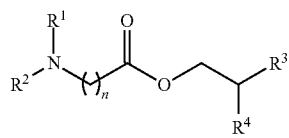

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

n is an integer from 2 to 5 (including 2 and 5);

$R^3$ is $C_5$-$C_{12}$ alkyl;

$R^4$ is $C_3$-$C_{10}$ alkyl;

the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

an optional counterion may be associated with the compound and, if present, the counterion may be selected from the group consisting of chloride, bromide, iodide, and 4-methylbenzenesulfonate;

one or more solvents;

a fixer agent; and water.

2. The formulation of claim 1, wherein the fixer agent is a metal carboxylate.

3. The formulation of claim 1, further comprising at least one of:

a humectant;

an acid;

an aqueous vehicle; and a colorant.

4. The formulation of claim 1, wherein the surfactant comprises at least one of:

6-((2-butyloctyl)oxy)-N,N,N-trimethyl-6-oxohexan-1-aminium iodide, having the following formula:

6-((2-butyloctyl)oxy)-N,N-dimethyl-6-oxohexan-1-aminium 4-methylbenzenesulfonate, having the following formula:

6-(dodecyloxy)-N,N-dimethyl-6-oxohexan-1-aminium chloride, having the following formula:

4-((6-((2-butyloctyl)oxy)-6-oxohexyl)dimethylammonio)butane-1-sulfonate, having the following formula:

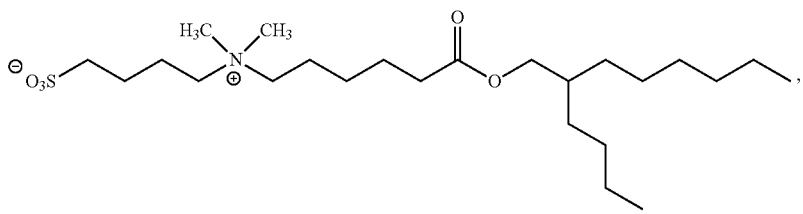

2-butyloctyl 6-(dimethylamino)hexanoate N-oxide, having the following formula:

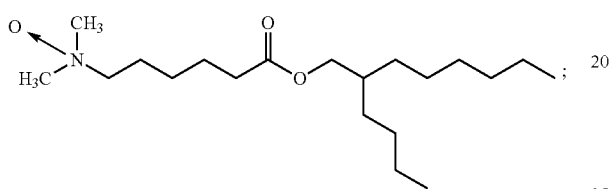

6-((2-butyloctyl)oxy)-6-oxohexan-1-aminium chloride, having the following formula:

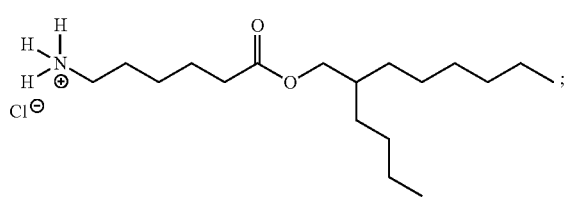 [SMILES: [Cl-] ; CCCCCCC(CCCC)COC(=O)CCCCC[NH3+]]

and
6-((2-butyloctyl)oxy)-6-oxohexan-1-aminium 4-methylbenzenesulfonate, having the following formula:

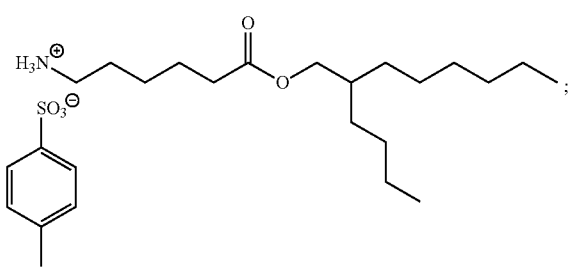

5. A formulation for a paint, comprising:
at least at least one surfactant of the following formula:

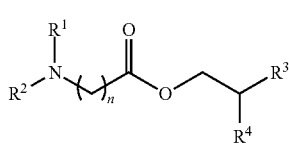

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

n is an integer from 2 to 5 (including 2 and 5);

$R^3$ is $C_5$-$C_{12}$ alkyl;

$R^4$ is $C_3$-$C_{10}$ alkyl;

the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

an optional counterion may be associated with the compound and, if present, the counterion may be selected from the group consisting of chloride, bromide, iodide, and 4-methylbenzenesulfonate;

a latex; and water.

6. The formulation of claim 5, further comprising at least one of:

one or more driers;

one or more solvents; and one or more pigments.

7. The formulation of claim 5, wherein the surfactant comprises at least one of:

6-((2-butyloctyl)oxy)-N,N,N-trimethyl-6-oxohexan-1-aminium iodide, having the following formula:

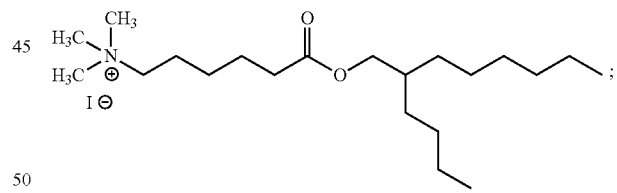

6-((2-butyloctyl)oxy)-N,N-dimethyl-6-oxohexan-1-aminium 4-methylbenzenesulfonate, having the following formula:

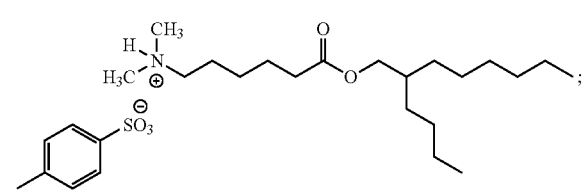

6-(dodecyloxy)-N,N-dimethyl-6-oxohexan-1-aminium chloride, having the following formula:

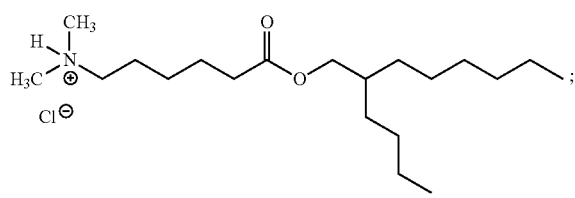 [SMILES: CCCCCCC(CCCC)COC(=O)CCCCC[NH+](C)C ; [Cl-]]

4-((6-((2-butyloctyl)oxy)-6-oxohexyl)dimethylammonio)butane-1-sulfonate, having the following formula:

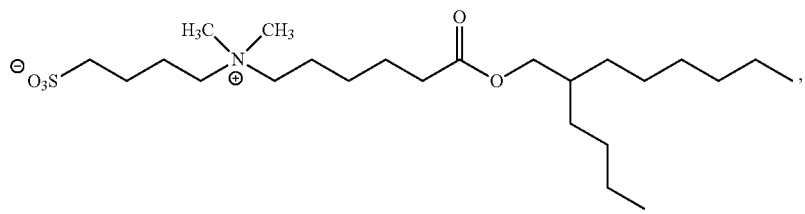

2-butyloctyl 6-(dimethylamino)hexanoate N-oxide, having the following formula:

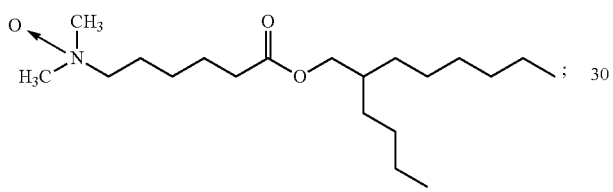

6-((2-butyloctyl)oxy)-6-oxohexan-1-aminium chloride, having the following formula:

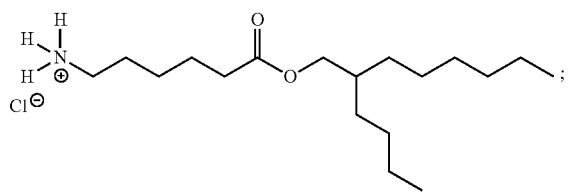 [SMILES: [Cl-] ; CCCCCCC(CCCC)COC(=O)CCCCC[NH3+]]

and 6-((2-butyloctyl)oxy)-6-oxohexan-1-aminium 4-methylbenzenesulfonate, having the following formula:

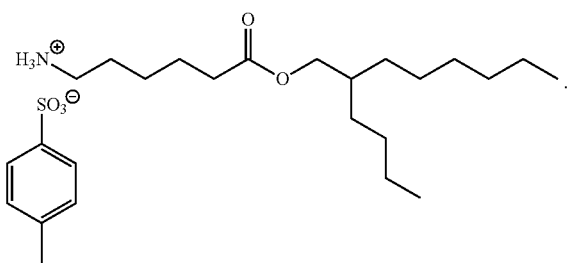

8. A formulation for a paint, comprising:

at least one surfactant of the following formula:

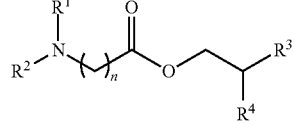

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

n is an integer from 2 to 5 (including 2 and 5);

$R^3$ is $C_5$-$C_{12}$ alkyl;

$R^4$ is $C_3$-$C_{10}$ alkyl;

the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

an optional counterion may be associated with the compound and, if present, the counterion may be selected from the group consisting of chloride, bromide, iodide, and 4-methylbenzenesulfonate;

a binder; and water.

9. The formulation of claim 8, further comprising at least one of:

one or more driers;

one or more solvents; and one or more pigments.

10. The formulation of claim 8, wherein the surfactant comprises at least one of:

6-((2-butyloctyl)oxy)-N,N,N-trimethyl-6-oxohexan-1-aminium iodide, having the following formula:

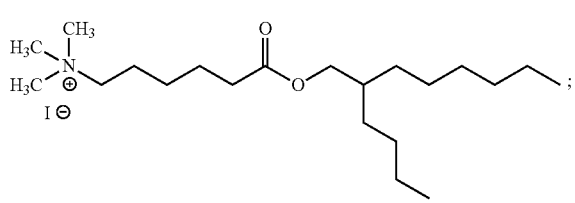 [SMILES: CCCCCCC(CCCC)COC(=O)CCCCC[N+](C)(C)C ; [I-]]

6-((2-butyloctyl)oxy)-N,N-dimethyl-6-oxohexan-1-aminium 4-methylbenzenesulfonate, having the following formula:

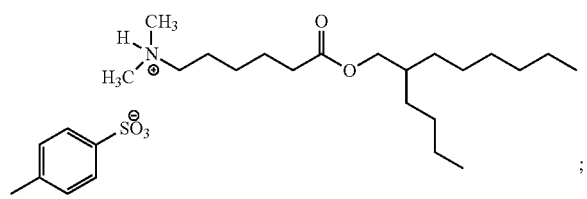

6-(dodecyloxy)-N,N-dimethyl-6-oxohexan-1-aminium chloride, having the following formula:

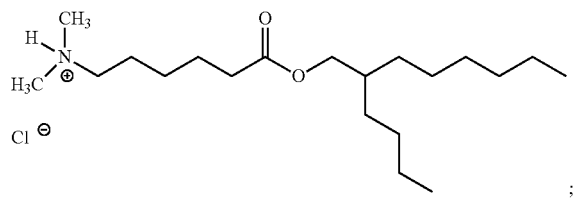 [SMILES: [Cl-] ; CCCCCCC(CCCC)COC(=O)CCCCC[NH+](C)C]

4-((6-((2-butyloctyl)oxy)-6-oxohexyl)dimethylammonio) butane-1-sulfonate, having the following formula:

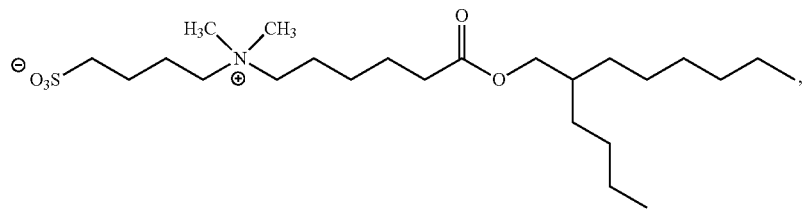

2-butyloctyl 6-(dimethylamino)hexanoate N-oxide, having the following formula:

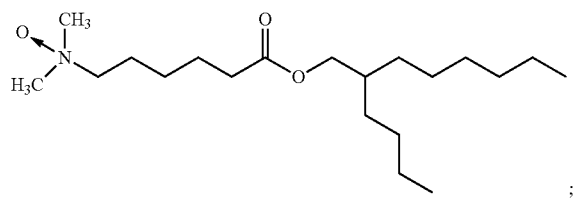 [SMILES: CCCCCCC(CCCC)COC(=O)CCCCC[N+](C)(C)[O-]]

6-((2-butyloctyl)oxy)-6-oxohexan-1-aminium chloride, having the following formula:

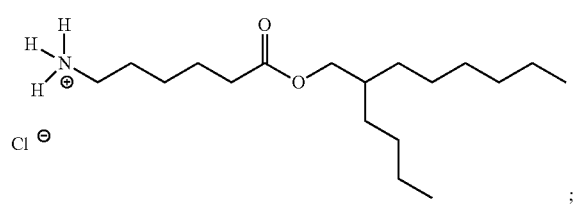 [SMILES: [Cl-] ; CCCCCCC(CCCC)COC(=O)CCCCC[NH3+]]

and 6-((2-butyloctyl)oxy)-6-oxohexan-1-aminium 4-methyl-benzenesulfonate, having the following formula:

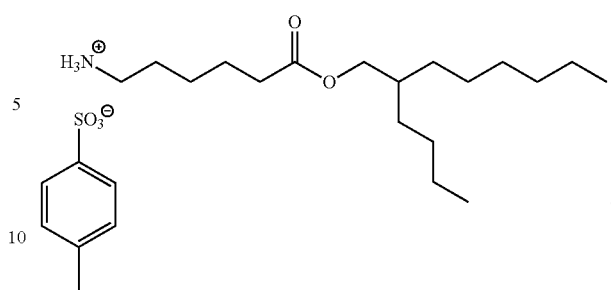

11. A formulation for an adhesive, comprising:
at least one surfactant of the following formula:

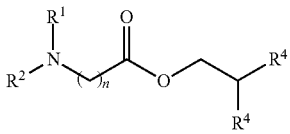

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

n is an integer from 2 to 5 (including 2 and 5);

$R^3$ is $C_5$-$C_{12}$ alkyl;

$R^4$ is $C_3$-$C_{10}$ alkyl;

the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

an optional counterion may be associated with the compound and, if present, the counterion may be selected from the group consisting of chloride, bromide, iodide, and 4-methylbenzenesulfonate;

an adhesive; and water.

12. The formulation of claim 11, further comprising a filling agent.

13. The formulation of claim 11, wherein the surfactant comprises at least one of:

6-((2-butyloctyl)oxy)-N,N,N-trimethyl-6-oxohexan-1-aminium iodide, having the following formula:

6-((2-butyloctyl)oxy)-N,N-dimethyl-6-oxohexan-1-aminium 4-methylbenzenesulfonate, having the following formula:

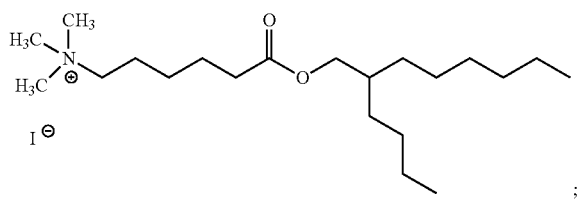 [SMILES: [I-] ; CCCCCCC(CCCC)COC(=O)CCCCC[N+](C)(C)C]

6-(dodecyloxy)-N,N-dimethyl-6-oxohexan-1-aminium chloride, having the following formula:

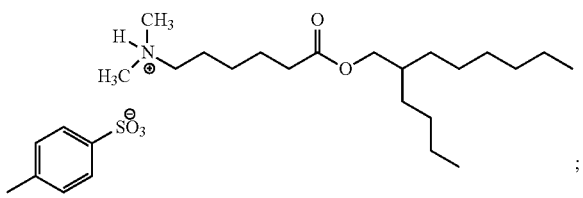

4-((6-((2-butyloctyl)oxy)-6-oxohexyl)dimethylammonio)butane-1-sulfonate, having the following formula:

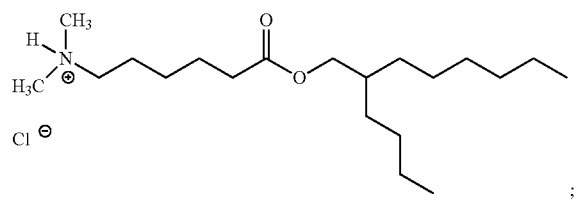 [SMILES: [Cl-] ; CCCCCCC(CCCC)COC(=O)CCCCC[NH+](C)C]

2-butyloctyl 6-(dimethylamino)hexanoate N-oxide, having the following formula:

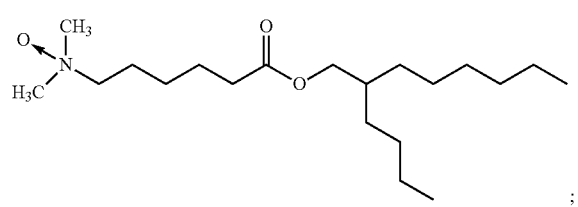 [SMILES: CCCCCCC(CCCC)COC(=O)CCCCC[N+](C)(C)[O-]]

6-((2-butyloctyl)oxy)-6-oxohexan-1-aminium chloride, having the following formula:

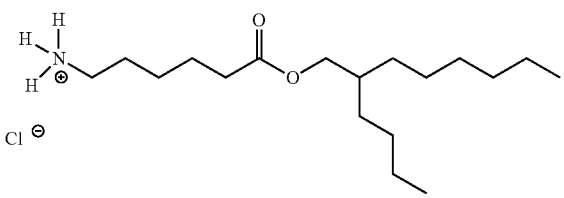

and 6-((2-butyloctyl)oxy)-6-oxohexan-1-aminium 4-methylbenzenesulfonate, having the following formula:

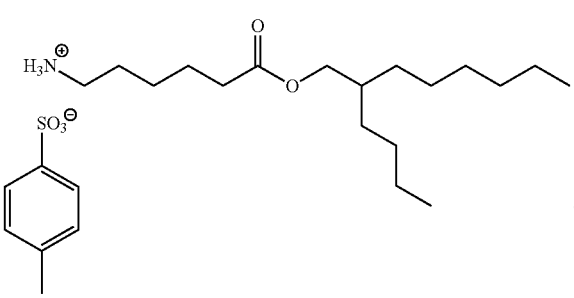

14. A formulation for a paint stripper, comprising:
at least one surfactant of the following formula:

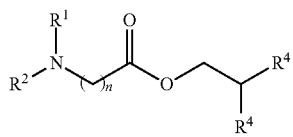

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

n is an integer from 2 to 5 (including 2 and 5);

$R^3$ is $C_5$-$C_{12}$ alkyl;

$R^4$ is $C_3$-$C_{10}$ alkyl;

the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;

an optional counterion may be associated with the compound and, if present, the counterion may be selected from the group consisting of chloride, bromide, iodide, and 4-methylbenzenesulfonate;

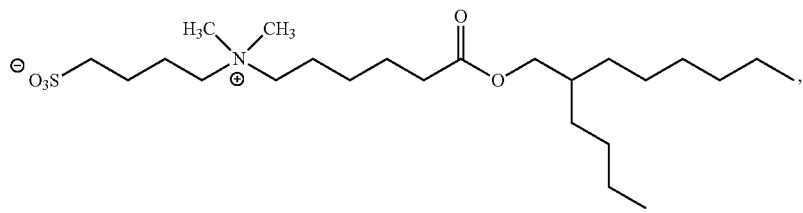

1,2-dichloroethylene; and
water.

15. The formulation of claim 14, further comprising at least one of:
a wax;
a corrosion inhibitor;
an organic solvent; and
a thickener.

16. The formulation of claim 14, wherein the surfactant comprises at least one of:
6-((2-butyloctyl)oxy)-N,N,N-trimethyl-6-oxohexan-1-aminium iodide, having the following formula:

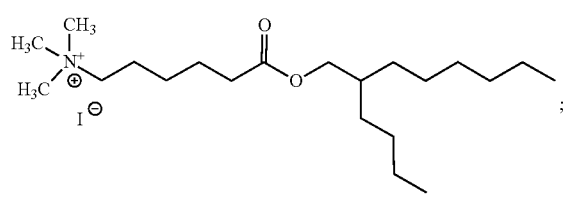

6-((2-butyloctyl)oxy)-N,N-dimethyl-6-oxohexan-1-aminium 4-methylbenzenesulfonate, having the following formula:

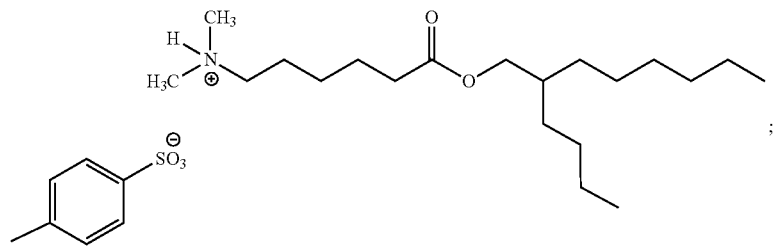

6-(dodecyloxy)-N,N-dimethyl-6-oxohexan-1-aminium chloride, having the following formula:

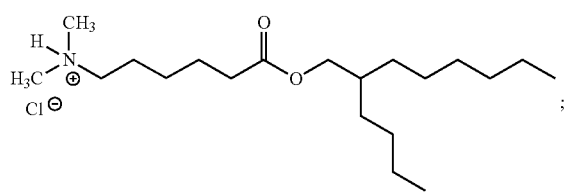 [SMILES: [Cl-] ; CCCCCCC(CCCC)COC(=O)CCCCC[NH+](C)C]

4-((6-((2-butyloctyl)oxy)-6-oxohexyl)dimethylammonio)butane-1-sulfonate, having the following formula:

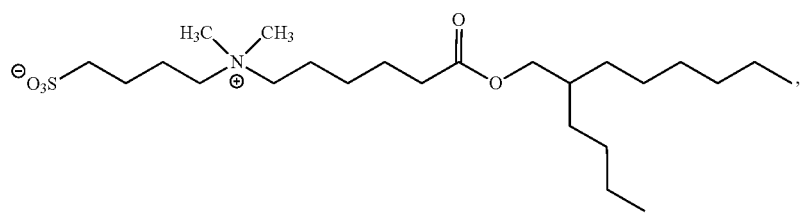

2-butyloctyl 6-(dimethylamino)hexanoate N-oxide, having the following formula:

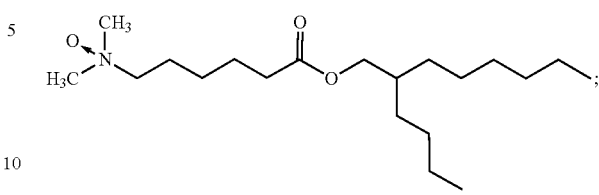

6-((2-butyloctyl)oxy)-6-oxohexan-1-aminium chloride, having the following formula:

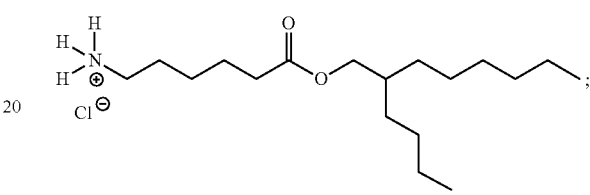

and
6-((2-butyloctyl)oxy)-6-oxohexan-1-aminium 4-methylbenzenesulfonate, having the following formula:

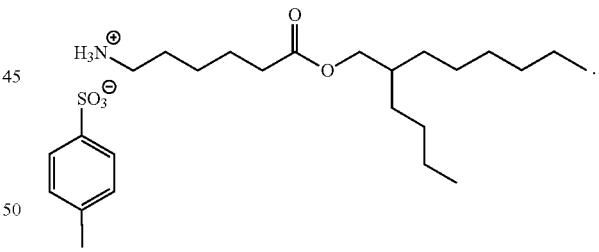

17. A formulation for a paint stripper, comprising:
at least one surfactant of the following formula:

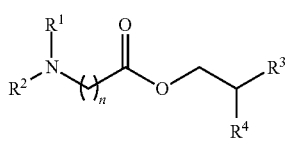

wherein $R^1$ and $R^2$ are independently chosen from hydrogen, an oxygen atom, and $C_1$-$C_6$ alkyl, wherein the $C_1$-$C_6$ alkyl may be substituted with carboxylates, hydroxyls, sulfonyls, or sulfonates;
n is an integer from 2 to 5 (including 2 and 5);
$R^3$ is $C_5$-$C_{12}$ alkyl;
$R^4$ is $C_3$-$C_{10}$ alkyl;
the terminal nitrogen is optionally further substituted with $R^5$, wherein $R^5$ is chosen from hydrogen, an oxygen atom, and $C_1$-$C_6$ alkyl, wherein the $C_1$-$C_6$ alkyl may be substituted with carboxylates, hydroxyls, sulfonyls, or sulfonates;
an optional counterion may be associated with the compound and, if present, the counterion may be selected from the group consisting of chloride, bromide, iodide, and 4-methylbenzenesulfonate;
1,2-dichloroethylene;
one or more co-solvents; and
water.

18. The formulation of claim 17, wherein the one or more co-solvents are selected from aromatic alcohols, aromatic ethers, and aliphatic alcohols.

19. The formulation of claim 17, further comprising at least one of:
a wax;
a corrosion inhibitor;
an organic solvent; and
a thickener.

20. The formulation of claim 17, wherein the surfactant comprises at least one of:
6-((2-butyloctyl)oxy)-N,N,N-trimethyl-6-oxohexan-1-aminium iodide, having the following formula:

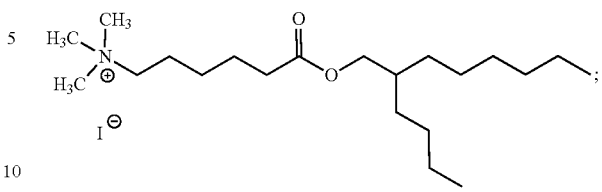

6-((2-butyloctyl)oxy)-N,N-dimethyl-6-oxohexan-1-aminium 4-methylbenzenesulfonate, having the following formula:

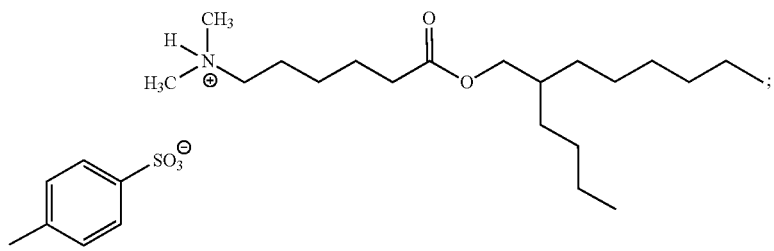

6-(dodecyloxy)-N,N-dimethyl-6-oxohexan-1-aminium chloride, having the following formula:

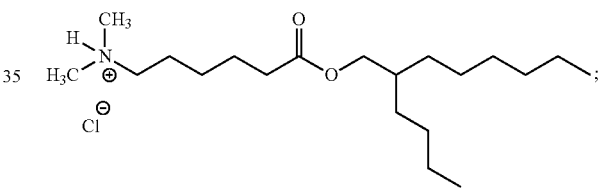

4-((6-((2-butyloctyl)oxy)-6-oxohexyl)dimethylammonio)butane-1-sulfonate, having the following formula:

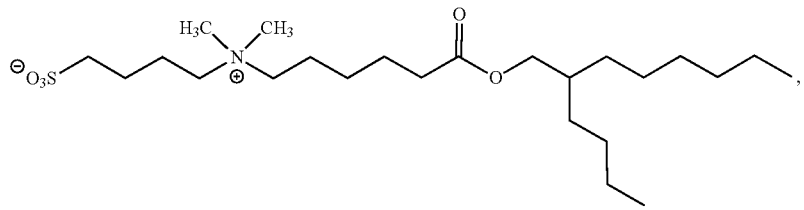

2-butyloctyl 6-(dimethylamino)hexanoate N-oxide, having the following formula:

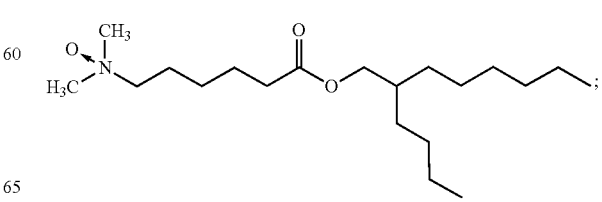

6-((2-butyloctyl)oxy)-6-oxohexan-1-aminium chloride, having the following formula:
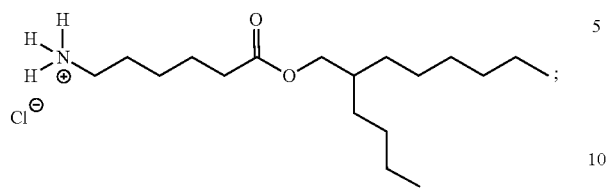
and
6-((2-butyloctyl)oxy)-6-oxohexan-1-aminium 4-methylbenzenesulfonate, having the following formula:
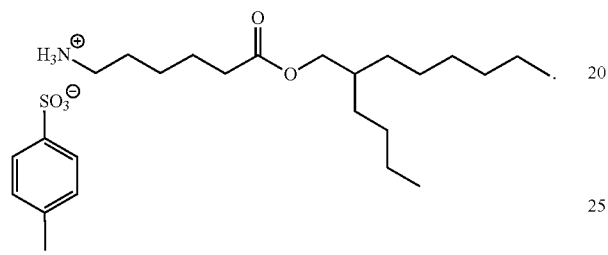
* * * * *